US012742949B2

(12) United States Patent
Asakura et al.

(10) Patent No.: US 12,742,949 B2
(45) Date of Patent: Sep. 22, 2026

(54) IMAGING OPTICAL SYSTEM

(71) Applicant: SIGMA CORPORATION, Kanagawa (JP)

(72) Inventors: Ken Asakura, Kanagawa (JP); Noriyuki Ogasawara, Tokyo (JP)

(73) Assignee: SIGMA CORPORATION, Kanagawa (JP)

( * ) Notice: Subject to any disclaimer, the term of this patent is extended or adjusted under 35 U.S.C. 154(b) by 192 days.

(21) Appl. No.: 18/901,572

(22) Filed: Sep. 30, 2024

(65) Prior Publication Data

US 2025/0130410 A1 Apr. 24, 2025

(30) Foreign Application Priority Data

Oct. 24, 2023 (JP) ................................ 2023-182301

(51) Int. Cl.

*G02B 15/14* (2006.01)
*G02B 13/00* (2006.01)
*G02B 13/02* (2006.01)

(52) U.S. Cl.

CPC ......... *G02B 13/02* (2013.01); *G02B 13/0045* (2013.01); *G02B 13/006* (2013.01)

(58) Field of Classification Search

CPC .................. G02B 9/12; G02B 15/1431; G02B 15/143101; G02B 15/143103; G02B 15/143105; G02B 15/143107

See application file for complete search history.

(56) References Cited

U.S. PATENT DOCUMENTS

2017/0068074 A1* 3/2017 Matsuo ................ G02B 27/646

FOREIGN PATENT DOCUMENTS

JP 6627313 1/2020

* cited by examiner

*Primary Examiner* — Joseph P Martinez
(74) *Attorney, Agent, or Firm* — Greenblum & Bernstein, P.L.C.

(57) ABSTRACT

It is aimed at providing an imaging optical system which is small-sized and lightweight, has a small-sized and lightweight focusing unit, and is therefore appropriate for a small-sized and lightweight telephoto lens. An imaging optical system of the present invention includes, in order from an object side toward an image side, a first lens group G1 having a positive power as a whole, a second lens group G2 including a lens that moves on an optical axis during focusing, and a third lens group G3 having a power, and satisfies predetermined conditional expressions.

13 Claims, 30 Drawing Sheets

IMAGING OPTICAL SYSTEM

FIELD OF THE INVENTION

The present invention relates to an imaging optical system appropriate for a photographing lens to be used in a still camera, a video camera, or the like.

BACKGROUND ART

Conventionally, as an imaging optical system appropriate for a long-focal-length photographing lens (hereinafter referred to as a telephoto lens), a telephoto-type imaging optical system, in which, from an object side toward an image side, a positive power lens group and a negative power lens groups are arranged, has been known. By using a telephoto-type power distribution, it is possible to shorten a total lens length of a telephoto lens that tends to be long and heavy.

Telephoto lenses are often used to photograph sports, animals, and the like, hence high-speed auto focus is required. When an all-element focusing system, in which an entire imaging optical system is moved for focusing, is used for a telephoto lens, a weight of the lens that moves during focusing increases and it is difficult to implement high-speed auto focus, and therefore an inner focus system is used in many cases.

Furthermore, in recent years, telephoto lenses have been increasingly used in video photography. When a telephoto lens is used in video photography, a contrast detection system is often used for auto focus. In the contrast detection system, to detect a contrast, it is common to cause a focusing unit to perform an operation referred to as wobbling, and therefore a telephoto lens equipped with a focusing unit lighter in weight than conventional ones is desired.

In addition, in recent years, with prevalence of compactly designed mirrorless cameras, telephoto lenses are also required to be smaller in size and lighter in weight. When a telephoto lens is to be reduced in size and weight, it is important to reduce not only a size of an imaging optical system thereof, but also a size and a weight of a movable portion. This is because a size and placement of an actuator are dependent on the size and weight of the movable portion.

SUMMARY OF THE INVENTION

Problem to be Solved

An imaging optical system described in Japanese Patent No. 6627313 uses inner focus to achieve high performance, but is insufficient in terms of size and weight reductions of a focusing unit. In addition, it cannot be said that a total lens length with respect to a focal length is sufficiently small.

The present invention has been made in view of such circumstances, and aims at providing an imaging optical system which is small-sized and lightweight, has a small-sized and lightweight focusing unit, and is, therefore, appropriate for a small-sized and lightweight telephoto lens.

Means for Solving the Problem

To attain the object described above, an imaging optical system implementing the present invention includes, in order from an object side toward an image side: a first lens group G1 having a positive power as a whole, a second lens group G2 including a lens that moves on an optical axis during focusing, and a third lens group G3 having a power, wherein conditional expressions below are satisfied:

$$-34.00 < \Phi\_G2G3/\Phi < -6.60 \quad (1)$$

$$1.00 < D\_EXP/H\_Img < 4.60 \quad (2)$$

$$0.40 < LT/f < 1.00 \quad (3)$$

where

Φ denotes power of the imaging optical system when focusing on infinity,

Φ_G2G3 denotes composite power of the second lens group G2 and the third lens group G3 when focusing on infinity, D_EXP denotes a distance on the optical axis from an exit pupil to an image surface in the imaging optical system when focusing on infinity, H_Img denotes a maximum image height, LT denotes a distance on the optical axis from a surface closest to the object side to the image surface in the imaging optical system when focusing on infinity, and f denotes a focal length of the imaging optical system when focusing on infinity.

According to the imaging optical system implementing the present invention, it is possible to provide an imaging optical system which is small-sized and lightweight, has a small-sized and lightweight focusing unit, and is therefore appropriate for a small-sized and lightweight telephoto lens.

DESCRIPTION OF EMBODIMENTS

Figure 1:
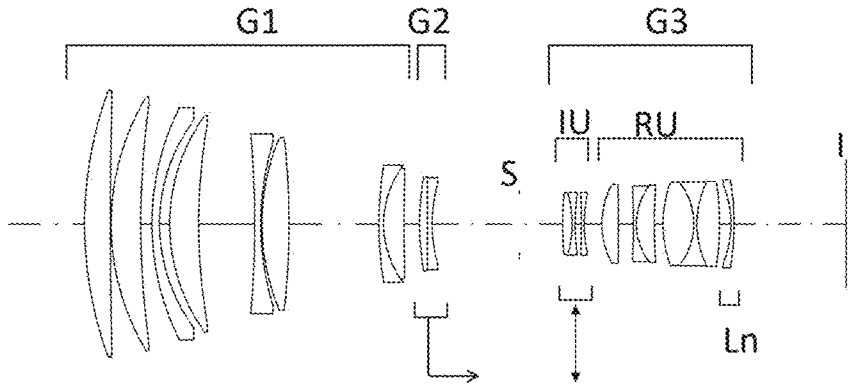
FIG. 1 is a lens configuration diagram at infinity in Example 1 of the present invention.
Figure 2:
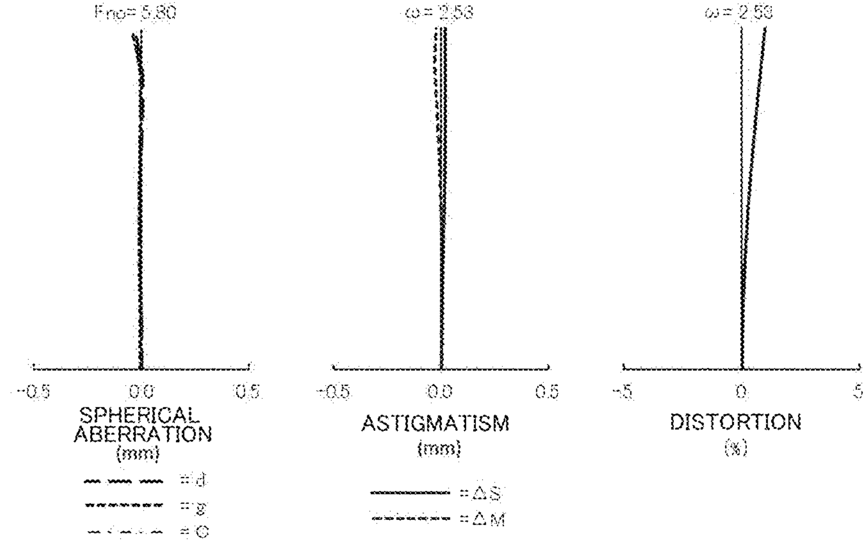
FIG. 2 is a longitudinal aberration diagram at infinity in Example 1 of the present invention.
Figure 3:
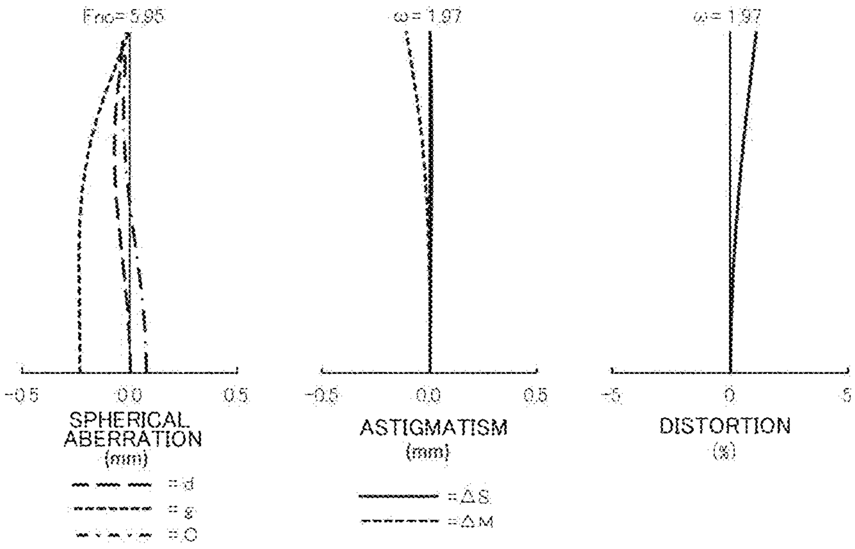
FIG. 3 is a longitudinal aberration diagram at a focusing distance of 3.2 m in Example 1 of the present invention.
Figure 4:
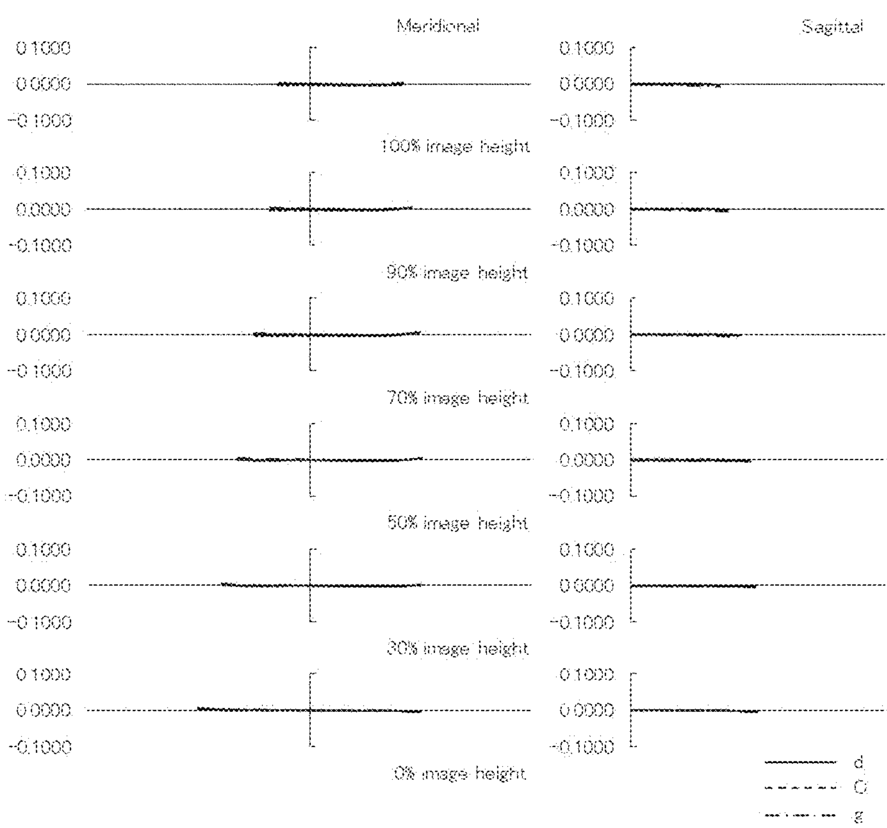
FIG. 4 is a lateral aberration diagram at infinity in Example 1 of the present invention.
Figure 5:
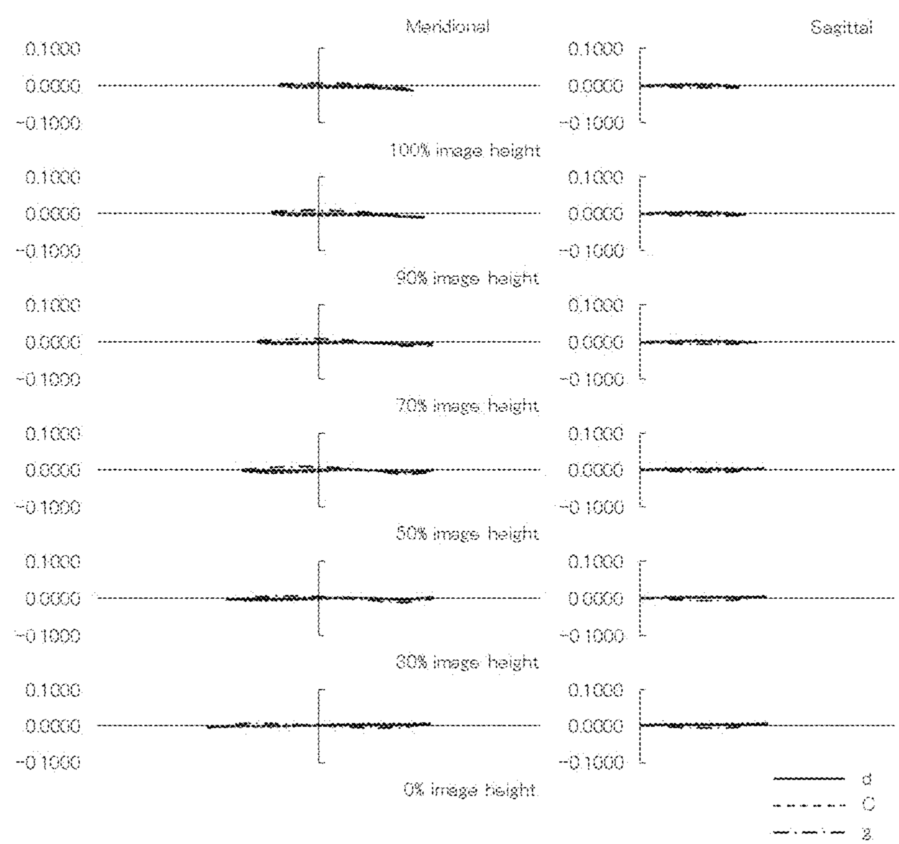
FIG. 5 is a lateral aberration diagram at a focusing distance of 3.2 m in Example 1 of the present invention.
Figure 6:
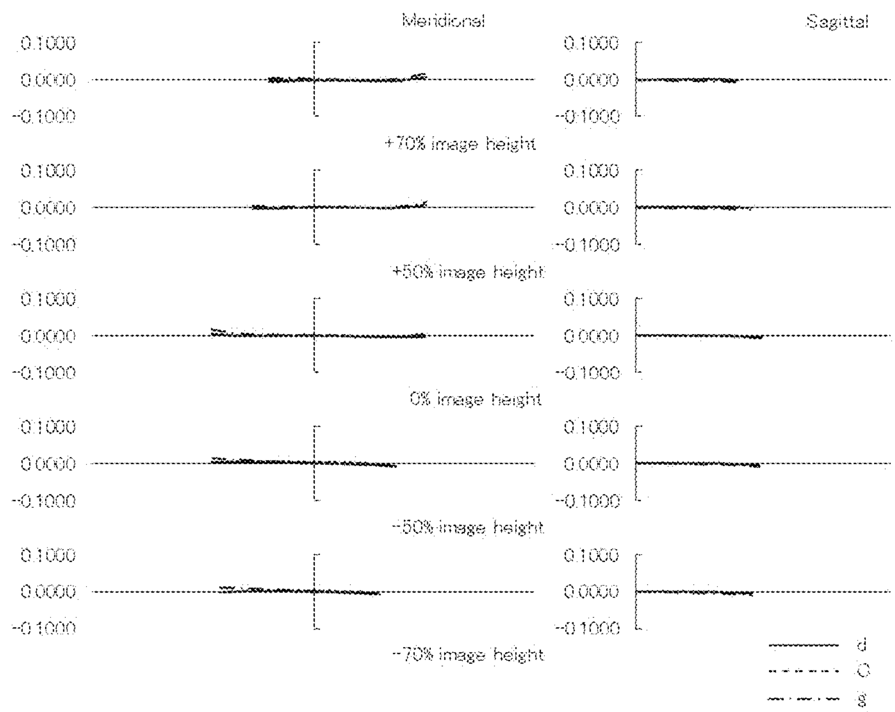
FIG. 6 is a lateral aberration diagram during 0.3° vibration control at infinity in Example 1 of the present invention.

A description will be given of an imaging optical system of the present invention. As can be understood from lens configurations diagrams illustrated in FIG. 1, FIG. 7, FIG. 13, FIG. 19, and FIG. 25, the imaging system of the present invention includes, in order from an object side toward an image side, a first lens group G1 having a positive power as a whole, a second lens group G2 including a lens that moves on an optical axis during focusing, and a third lens group G3 having a power.

By providing such a group configuration, due to an effect of convergence of a light flux achieved by the first lens group G1 having the positive power as a whole, it is possible to reduce diameters of the second lens group G2 and the third lens group G3, which are focusing units. By reducing the diameters of the focusing units which are movable portions, it is easier to achieve a lighter weight, and therefore an actuator can also be reduced in size and weight. Since the actuator can also be reduced in size and weight, while the diameters of the second lens group G2 and the third lens group G3 are reduced, it is possible to provide a small-sized and lightweight telephoto lens.

In addition, by disposing the first lens group G1 having the positive power on the object and arranging the second lens group G2 and the third lens group G3 having the negative power on the image side, it is possible to configure a telephoto-type power distribution, which is effective in reducing a total length of the imaging optical system. Moreover, to allow a dust proof and drip-proof mechanism to be easily provided, it is desirable that the first lens group G1 disposed closest to the object side and the lens disposed closest to the image side in the imaging optical system are constantly fixed relative to the image surface. Furthermore, since it is conceivable that, when a user attaches or detaches a replacement lens to or from a camera, the lens disposed closest to the image side in the imaging optical system is touched, it is desirable that a unit constantly fixed relative to the image surface is disposed closest to the image side in the imaging optical system.

In addition, in the imaging optical system of the present invention, the following conditional expressions are satisfied:

$$-34.00 < \Phi\_G2G3/\Phi < -6.60 \quad (1)$$

$$1.00 < D\_EXP/H\_Img < 4.60 \quad (2)$$

$$0.40 < LT/f < 1.00 \quad (3)$$

where

Φ denotes power of the imaging optical system when focusing on infinity,

Φ_G2G3 denotes composite power of the second lens group G2 and the third lens group G3 when focusing on infinity, D_EXP denotes a distance on the optical axis from an exit pupil to an image surface in the imaging optical system when focusing on infinity, H_Img denotes a maximum image height, LT denotes a distance on the optical axis from a surface closest to the object side to the image surface in the imaging optical system when focusing on infinity, and f denotes a focal length of the imaging optical system when focusing on infinity.

The conditional expression (1) defines a ratio between the composite power of the second lens group G2 and the third lens group G3 and a power of the entire system in the imaging optical system when focusing on infinity.

When the negative composite power of the second lens group G2 and the third lens group G3 decreases beyond the upper limit value of the conditional expression (1), the effect of the telephoto type is weakened and the size reduction of the imaging optical system becomes difficult. When the negative composite power of the second lens group G2 and the third lens group G3 increases beyond the lower limit value of the conditional expression (1), the effect of enlarging aberration is increased and it becomes difficult to obtain excellent performance.

Preferably, the upper limit value of the conditional expression (1) is limited to −8.30, since this can more reliably ensure the effect described above. Preferably, the lower limit value of the conditional expression (1) is limited to −24.00, since this can more reliably ensure the effect described above.

More preferably, the upper limit value of the conditional expression (1) is limited to −9.50, since this can more reliably ensure the effect described above. Preferably, the lower limit value of the conditional expression (1) is limited to −18.00, since this can more reliably ensure the effect described above.

The conditional expression (2) defines a ratio between a distance from an exit pupil to the image surface and a maximum image height in the imaging optical system when focusing on infinity.

When the exit pupil moves away from the image surface toward the object over side beyond the upper limit value of the conditional expression (2), the ray height in the vicinity of the image surface is increased. However, in the vicinity of the image surface, there is a part for attachment to the camera, and a ray is subjected to vignetting, and therefore it becomes difficult to ensure peripheral illumination. When the exit pupil becomes closer to the image surface beyond the lower limit value of the conditional expression (2), the principal ray ejection angle of the lens disposed closest to the image side is increased. When an image capturing element to be used for a digital camera or the like is used, the image capturing element generally has a characteristic such that a sensitivity to light at a large incidence angle to the image capturing element decreases. Therefore, when a ray has a large incidence angle, it is difficult to ensure peripheral illumination.

Preferably, the upper limit value of the conditional expression (2) is set to 4.30, since this can more reliably ensure the effect described above. Preferably, the lower limit value of the conditional expression (2) is set to 2.00, since this can more reliably ensure the effect described above.

More preferably, the upper limit value of the conditional expression (2) is limited to 4.10, since this can more reliably ensure the effect described above. Preferably, the lower limit value of the conditional expression (2) is limited to 2.70, since this can more reliably ensure the effect described above.

The conditional expression (3) defines a ratio between a total lens length and a focal length in the imaging optical system when focusing on infinity.

When the total lens length increases beyond the upper limit of the conditional expression (3), it becomes difficult to reduce the size and the weight of the telephoto lens. When the total lens length becomes shorter beyond the lower limit of the conditional expression (3), the amount of movement of the focusing unit cannot be increased and, when the practically shortest focusing distance is to be achieved, power of the focusing unit should be increased. Consequently, aberration occurring in the focusing unit is increased and it becomes difficult to obtain excellent performance in a wide focusing distance range.

Preferably, the upper limit value of the conditional expression (3) is limited to 0.64, since this can more reliably ensure the effect described above. Preferably, the lower limit value of the conditional expression (3) is limited to 0.44, since this can more reliably ensure the effect described above.

More preferably, the upper limit value of the conditional expression (3) is limited to 0.56, since this can more reliably ensure the effect described above. Preferably, the lower limit value of the conditional expression (3) is limited to 0.48, since this can more reliably ensure the effect described above.

In the imaging optical system of the present invention, when a lens component is a single lens or a cemented lens, a lens component Ln disposed closest to the image side has a negative power and satisfies the following conditional expression:

$$-20.00 < \Phi\_Ln/\Phi < -0.01 \quad (4)$$

where $\Phi\_Ln$ denotes power of the lens component Ln disposed closest to the image side in the imaging optical system.

The lens component Ln disposed closest to the image side in the imaging optical system has a negative power, which allows a position of the exit pupil to be set and also allows the aberration to be corrected.

The conditional expression (4) defines a ratio between the power of the lens component Ln and the power of the entire system in the imaging optical system when focusing on infinity.

When the power of the lens component Ln decreases beyond the upper limit of the conditional expression (4), the lens for focusing and image blur correction assumes a negative power for controlling the exit pupil, and consequently the aberration during the focusing and during image blur correction is increased and it becomes difficult to obtain excellent performance. When the power of the lens component Ln increases beyond the lower limit of the conditional expression (4), large positive distortion occurs and it becomes difficult to perform excellent correction.

Preferably, the upper limit value of the conditional expression (4) is limited to −3.00, since this can more reliably ensure the effect described above. Preferably, the lower limit value of the conditional expression (4) is limited to −15.00, since this can more reliably ensure the effect described above.

More preferably, the upper limit value of the conditional expression (4) is limited to −4.00, since this can more reliably ensure the effect described above. Preferably, the lower limit value of the conditional expression (4) is limited to −10.00, since this can more reliably ensure the effect described above.

In addition, in the imaging optical system of the present invention, the following conditional expression is satisfied:

$$-20.00 < \Phi\_G3/\Phi < -1.00 \quad (5)$$

where $\Phi\_G3$ denotes the power of the third lens group G3.

The conditional expression (5) defines a power ratio between the third lens group G3 and the entire system.

When the negative power of the third lens group G3 decreases beyond the upper limit value of the conditional expression (5), in order to maintain the telephoto-type power distribution while maintaining the focal length of the entire system, it is necessary to increase the negative power of the second lens group G2. When the negative power of the second lens group G2, which is the focusing unit, is excessively increased, astigmatism greatly fluctuates during the focusing and it becomes difficult to obtain excellent performance in a wide focusing distance range. When the negative power of the third lens group G3 increases beyond the lower limit value of the conditional expression (5), it becomes difficult to ensure sufficient back focus. In addition, since the effect of enlarging the aberration is increased, it becomes difficult to obtain excellent performance.

Preferably, the upper limit value of the conditional expression (5) is limited to −1.50, since this can more reliably ensure the effect described above. Preferably, the lower limit value of the conditional expression (5) is limited to −14.00, since this can more reliably ensure the effect described above.

More preferably, the upper limit value of the conditional expression (5) is limited to −4.00, since this can more reliably ensure the effect described above. Preferably, the lower limit value of the conditional expression (5) is limited to −11.00, since this can more reliably ensure the effect described above.

In addition, in the imaging optical system of the present invention, the third lens group G3 has an image blur correction unit and has a rear unit on the image side of the image blur correction unit, respective powers of the image blur correction unit and the rear unit have different signs, and the following conditional expression is satisfied:

$$3.00 < |\Phi\_OS/\Phi| < 35.00 \quad (6)$$

where $\Phi\_OS$ denotes the power of the image blur correction unit.

By disposing the rear unit having a sign different from that of the power of the image blur correction unit, it is possible to increase the power of the image blur correction unit while maintaining the power of the third lens group G3, and it is possible to increase an amount of image blur correction (hereinafter referred to as the anti-vibration coefficient) with respect to an amount of movement of the image blur correction unit. When the anti-vibration coefficient is increased, it is possible to reduce the amount of movement of the image blur correction unit and therefore it is possible to reduce a size of the actuator, which is advantageous for size and weight reductions of the telephoto lens.

The conditional expression (6) defines a ratio between the power of the image blur correction unit and the power of the imaging optical system.

When the power of the image blur correction unit decreases beyond the upper limit value of the conditional expression (6), the anti-vibration coefficient decreases, and consequently it becomes necessary to increase the amount of drive of the image blur correction unit and it becomes difficult to reduce the size of the actuator and the size of the telephoto lens. When the power of the image blur correction unit increases beyond the lower limit value of the conditional expression (6), it is possible to increase the anti-vibration coefficient, but the aberration occurring in the image blur correction unit is increased and comatic aberration and astigmatism greatly fluctuate when the image blur correction unit is driven in a direction perpendicular to the optical axis, and accordingly it becomes difficult to obtain excellent performance during the image blur correction.

Preferably, the upper limit value of the conditional expression (6) is limited to 26.00, since this can more reliably ensure the effect described above. Preferably, the lower limit value of the conditional expression (6) is limited to 5.00, since this can more reliably ensure the effect described above.

More preferably, the upper limit value of the conditional expression (6) is limited to 22.00, since this can more reliably ensure the effect described above. Preferably, the lower limit value of the conditional expression (6) is limited to 7.00, since this can more reliably ensure the effect described above.

In addition, in the imaging optical system of the present invention, the third lens group G3 has an image blur correction unit and has a rear unit on the image side of the image blur correction unit, and the image blur correction unit has at least one positive lens and at least one negative lens.

Since the image blur correction unit has the at least one positive lens and the at least one negative lens, it is possible to correct chromatic aberration in the image blur correction unit and obtain excellent performance during the image blur correction.

In addition, in the imaging optical system of the present invention, an aperture diaphragm is disposed on the image side of the first lens group G1.

By disposing the aperture diaphragm on the image side of the first lens group G1, it is possible to arrange the second lens group G2 and the image blur correction unit, which are movable groups, at a position where a light flux at a peripheral angle of view is low and reduce diameters of the movable groups. This allows higher-speed focusing and can further reduce the sizes of the actuators of the focusing unit and the image blur correction unit, and therefore it is possible to reduce the size and weight of the telephoto lens.

In addition, in the imaging optical system of the present invention, an aperture diaphragm is disposed between the second lens group G2 and the third lens group G3.

By disposing the aperture diaphragm between the second lens group G2 and the third lens group G3, it is possible to arrange the second lens group G2 and the image blur correction unit, which are the movable groups, at the position where the light flux at the peripheral angle of view is low and reduce the diameters of the movable groups. This allows higher-speed focusing and can further reduce the sizes of the actuators of the focusing unit and the image blur correction unit, and therefore it is possible to reduce the size and weight of the telephoto lens.

In addition, in the imaging optical system of the present invention, the following conditional expression is satisfied:

$$0.040 < D\_pn/LT < 0.40 \tag{7}$$

where

D_pn denotes a distance on the optical axis from an object-side lens surface of a lens disposed closest to the object side and an object-side lens surface of a negative lens disposed closest to the object side on the image surface side of the lens in the imaging optical system.

The conditional expression (7) defines a ratio between a distance on the optical axis from the object-side lens surface disposed closest to the object side and the object-side lens surface of the negative lens disposed closest to the object side on the image surface side of the lens and the distance on the optical axis from the surface closest to the object side to the image surface when focusing on infinity.

When D_Pn is elongated beyond the upper limit of the conditional expression (7), the chromatic aberration occurring in the object-side lens is increased. When correction is performed in the subsequent lens group, it becomes difficult to simultaneously correct on-axis chromatic aberration and magnification chromatic aberration, and it becomes difficult to obtain excellent performance. When D_Pn is shortened beyond the lower limit of the conditional expression (7), a ray height in the negative lens disposed closest to the object side is increased, and a weight of the lens is also increased. Consequently, it becomes difficult to simultaneously achieve a size reduction and a weight reduction of an entire lens system.

Preferably, the upper limit value of the conditional expression (7) is limited to 0.28, since this can more reliably ensure the effect described above. Preferably, the lower limit value of the conditional expression (7) is limited to 0.060, since this can more reliably ensure the effect described above.

More preferably, the upper limit value of the conditional expression (7) is limited to 0.16, since this can more reliably ensure the effect described above. Preferably, the lower limit value of the conditional expression (7) is limited to 0.070, since this can more reliably ensure the effect described above.

In addition, in the imaging optical system of the present invention, the following conditional expression is satisfied:

$$-12.00 < \Phi\_G2/\Phi < -0.13 \tag{8}$$

where $\Phi\_G2$ denotes power of the second lens group G2.

The conditional expression (8) defines a preferred range for a power ratio between the second lens group G2 and the imaging optical system.

When the negative power of the second lens group G2 decreases beyond the upper limit value of the conditional expression (8), a roll of the negative power disposed on the image side of the telephoto type is assigned to the third lens group G3 to increase the negative power of the third lens group G3. Since the effect of enlarging the aberration in the third lens group G3 is increased, it becomes difficult to obtain excellent performance. When the negative power of the second lens group G2 increases beyond the lower limit value of the conditional expression (8), aberration, especially astigmatism, is likely to occur in the second lens group G2, which is the focusing unit, and consequently it becomes difficult to obtain excellent performance in a wide focusing distance range.

Preferably, the upper limit value of the conditional expression (8) is limited to −0.20, since this can more reliably ensure the effect described above. Preferably, the lower limit value of the conditional expression (8) is limited to −9.00, since this can more reliably ensure the effect described above.

More preferably, the lower limit value of the conditional expression (8) is limited to −6.00, since this can more reliably ensure the effect described above.

In addition, the imaging optical system of the present invention further includes: a negative lens satisfying the following conditional expressions on the image side of an aperture diaphragm:

$$10.00 < v\_d < 30.00 \tag{9}$$

$$0.020 < P\_gF + 0.0018 * v\_d \cdot 0.6483 < 0.080 \tag{10}$$

where v_d denotes an Abbe number of the negative lens relative to a d-line,

P_gF denotes a partial dispersion ratio of the negative lens relative to a g-line and an F-line, P_gF=(ng−nF)/(nF−nC) defines the partial dispersion ratio as such, ng: a refractive index to the g-line (wavelength λ=435.84 nm), nF: a refractive index to the F-line (wavelength λ=486.13 nm), and nC: a refractive index to a C-line (wavelength λ=656.27 nm).

By having the negative lens satisfying the conditional expressions (9) and (10) on the image side of the aperture diaphragm, it is possible to achieve excellent chromatic aberration correction.

The conditional expression (9) defines a preferred range for an Abbe number of the negative lens to the d-line.

When the Abbe number to the d-line increases beyond the upper limit value of the conditional expression (9), an effect of cancelling out the chromatic aberration is weakened and it becomes difficult to correct the chromatic aberration in the entire lens system. In addition, it becomes difficult to choose a material satisfying the conditional expression (10). When the Abbe number to the d-line decreases beyond the lower limit value of the conditional expression (9), the effect of enlarging the chromatic aberration is increased and it becomes difficult to correct the chromatic aberration in the entire lens system.

Preferably, the upper limit value of the conditional expression (9) is limited to 24.00, since this can more reliably ensure the effect described above. Preferably, the lower limit value of the conditional expression (9) is limited to 15.00, since this can more reliably ensure the effect described above.

More preferably, the upper limit value of the conditional expression (9) is limited to 21.00, since this can more reliably ensure the effect described above. Preferably, the lower limit value of the conditional expression (9) is limited to 16.00, since this can more reliably ensure the effect described above.

The conditional expression (10) defines a preferred range of the partial dispersion ratio of the negative lens to the g-line and the F-line.

When the partial dispersion ratio to the g-line and the F-line increases beyond the upper limit value of the conditional expression (10), the chromatic aberration of the g-line particularly increases in a positive direction and it becomes difficult to correct the chromatic aberration in the entire lens system. When the partial dispersion ratio to the g-line and the F-line decreases beyond the lower limit value of the conditional expression (10), the chromatic aberration of the g-line particularly increases in a negative direction and it becomes difficult to correct the chromatic aberration in the entire lens system.

Preferably, the upper limit value of the conditional expression (10) is limited to 0.048, since this can more reliably ensure the effect described above. Preferably, the lower limit value of the conditional expression (10) is limited to 0.024, since this can more reliably ensure the effect described above.

More preferably, the upper limit value of the conditional expression (10) is limited to 0.041, since this can more reliably ensure the effect described above. Preferably, the lower limit value of the conditional expression (10) is limited to 0.027, since this can more reliably ensure the effect described above.

In addition, in the imaging optical system of the present invention, an object-side surface and an image-side surface of each of the lenses is made of a curved surface or a planar surface. Specifically, in the imaging optical system of the present invention, no diffractive optical element is used. If a diffractive optical element is used, a diffractive surface can have a chromatic aberration correcting effect and an aspherical effect, but unneeded diffracted light resulting from a shape thereof or a ray outside an angle of view undesirably causes flare. Since the imaging optical system of the present invention uses no diffractive optical element, it is possible to prevent occurrence of flare or ghost resulting from a diffractive optical element.

In addition, in the imaging optical system of the present invention, an object-side surface and an image-side surface of each of the lenses is made of a spherical surface or a planar surface. A spherical lens, which can be equally processed even when rotation around a center of a sphere occurs during the processing, is easier to produce than a lens having no spherical surface. Since a lens included in an imaging optical system of a telephoto lens tends to have a large diameter, it is desirable to be able to obtain a lens with excellent processing accuracy at low processing cost.

In addition, in the imaging optical system of the present invention, the third lens group G3 has an image blur correction unit and has a rear unit on the image side of the image blur correction unit, respective powers of the image blur correction unit and the rear unit have different signs, the image blur correction unit has at least one positive lens and at least one negative lens, an aperture diaphragm is disposed between the second lens group G2 and the third lens group G3, and the following conditional expression is satisfied:

$$3.00 < |\Phi\_OS/\Phi| < 35.00 \quad (6)$$

where Φ_OS denotes a focal length of the image blur correction unit.

Particularly by using this configuration, a principal ray passes through the vicinity of an optical axis of the image blur correction unit, and a color elimination effect due to the positive lens and the negative lens is achieved and, by providing an appropriate power distribution, it becomes possible to perform excellent chromatic aberration correction during the image blur correction.

Next, a description will be given of a lens configuration in each of examples related to the imaging optical system of the present invention. Note that, in the following description, the lens configuration will be described in order from the object side to the image side.

Example 1

FIG. 1 is a lens configuration diagram of the imaging optical system in Example 1 of the present invention. A first lens group G1 is configured to include a meniscus-shaped positive lens L1 with a convex surface facing the object side, a meniscus-shaped positive lens L2 with a convex surface facing the object side, a meniscus-shaped negative lens L3 with a convex surface facing the object side, a meniscus-shape positive lens L4 with a convex surface facing the object side, a negative lens L5 with a biconcave shape, a positive lens L6 with a biconvex shape, and a cemented lens including a meniscus-shaped negative lens L7 with a convex surface facing the object side and a meniscus-shaped positive lens L8 with a convex surface facing the object side, and has a positive power as a whole. In addition, the first lens group G1 is constantly fixed relative to an image surface.

A second lens group G2 is configured to include a cemented lens including a meniscus-shaped positive lens L9 with a convex surface facing the object side and a meniscus-shaped negative lens L10 with a convex surface facing the object side, and has a negative power as a whole. In addition, the second lens group G2 moves on an optical axis from the object side toward the image side during focusing from an infinite distance object to a closer distance object.

A third lens group G3 is configured to include an image blur correction unit IU and a rear unit RU, and has a negative power as a whole. In addition, the third lens group G3 is fixed relative to the image surface during the focusing.

The image blur correction unit IU is configured to include a cemented lens including a positive lens L11 with a biconvex shape and a negative lens L12 with a biconcave shape, and a negative lens L13 with a biconcave shape, and has a negative power as a whole. In addition, the image blur correction unit IU moves in a direction perpendicular to the optical axis so as to reduce image blur due to blur of the imaging optical system.

The rear unit RU is configured to include a positive lens L14 with a biconvex shape, a cemented lens including a negative lens L15 with a biconcave shape and a meniscus-shaped positive lens L16 with a convex surface facing the object side, a three-cemented lens including a positive lens L17 with a biconvex shape, a negative lens L18 with a biconcave shape, and a positive lens L19 with a biconvex shape, and a meniscus-shaped negative lens L20 with a concave surface facing the object side, and has a negative power as a whole. In addition, the rear unit RU is constantly fixed relative to the image surface.

An aperture diaphragm S is disposed between the second lens group G2 and the third lens group G3. A lens component Ln disposed closest to the image side in the imaging optical system is the negative lens L20.

Example 2

Figure 7:
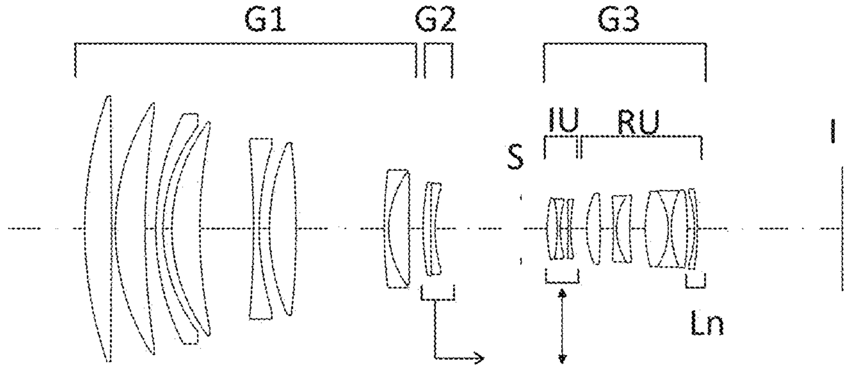
FIG. 7 is a lens configuration diagram at infinity in Example 2 of the present invention.
Figure 8:
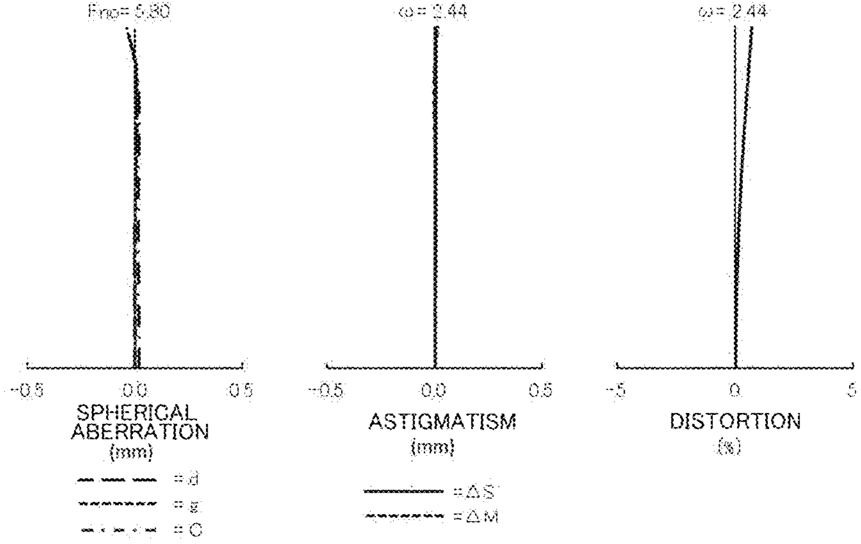
FIG. 8 is a longitudinal aberration diagram at infinity in Example 2 of the present invention.
Figure 9:
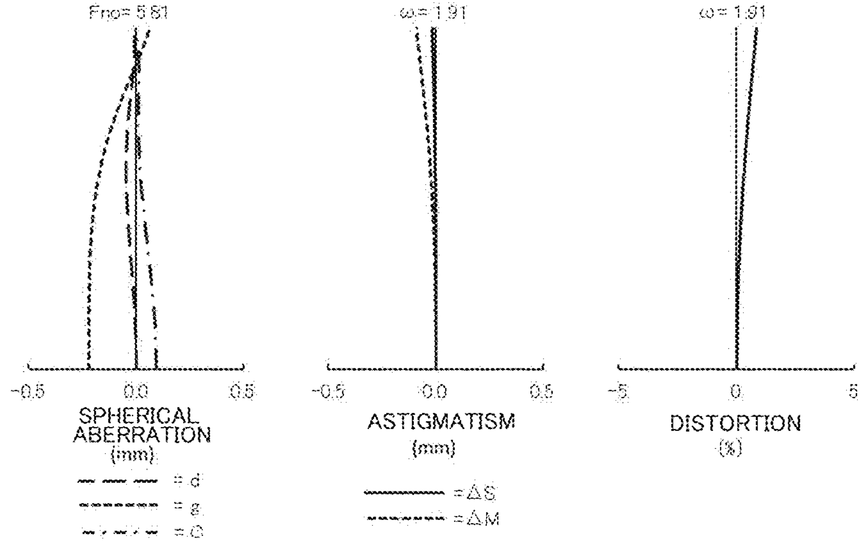
FIG. 9 is a longitudinal aberration diagram at a focusing distance of 3.3 m in Example 2 of the present invention.
Figure 10:
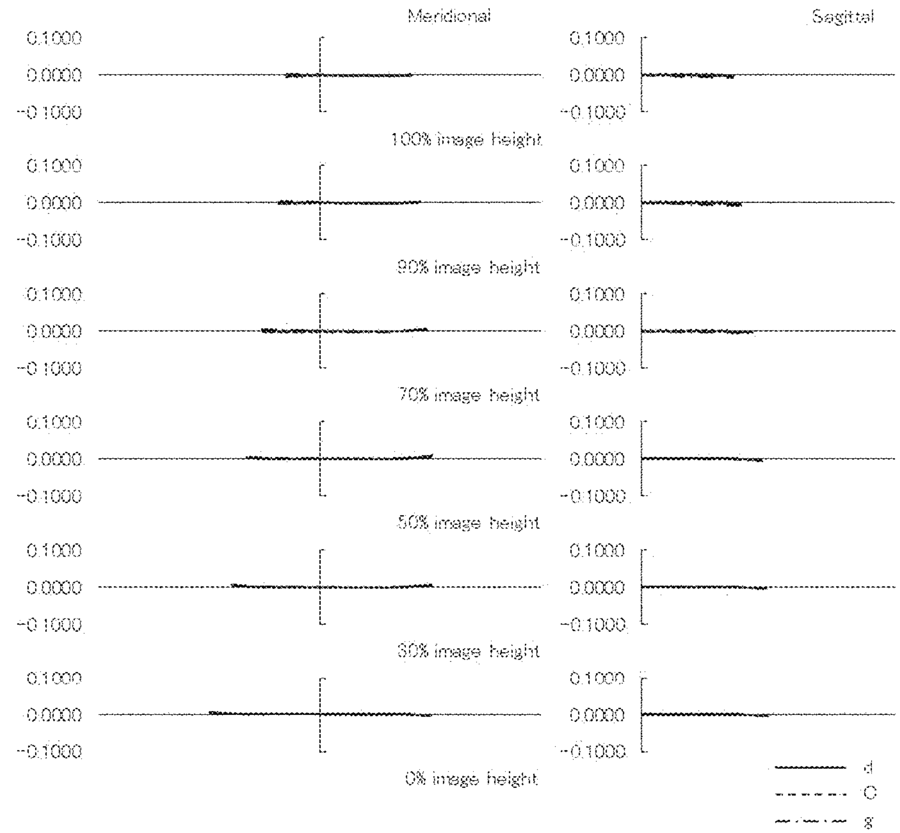
FIG. 10 is a lateral aberration diagram at infinity in Example 2 of the present invention.
Figure 11:
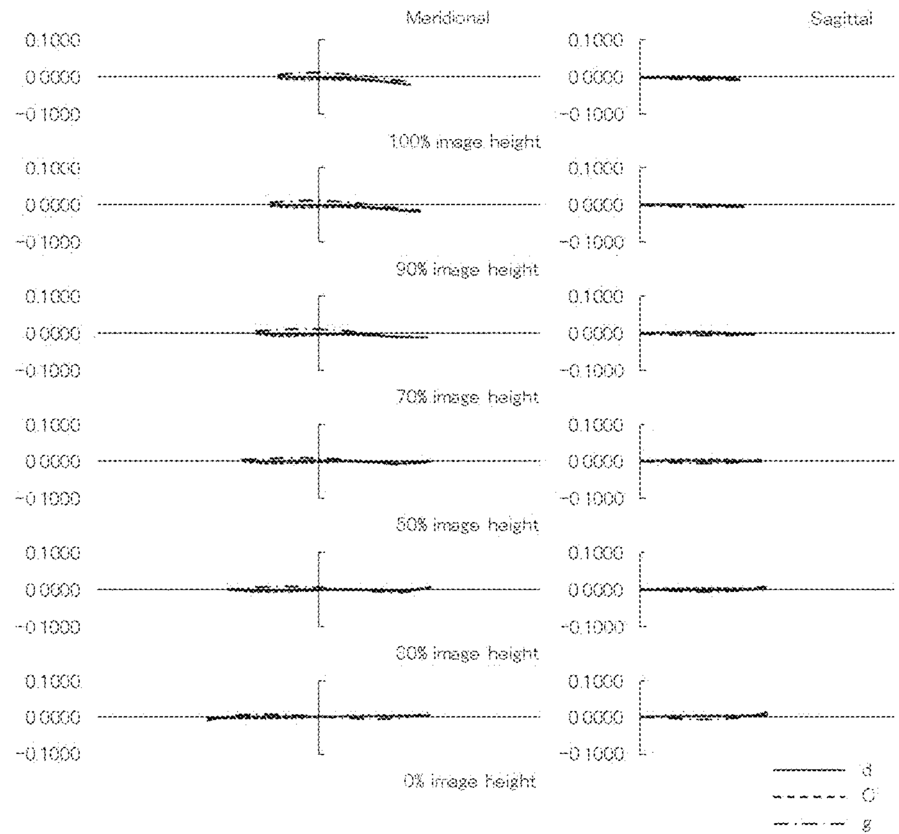
FIG. 11 is a lateral aberration diagram at a focusing distance of 3.3 m in Example 2 of the present invention.
Figure 12:
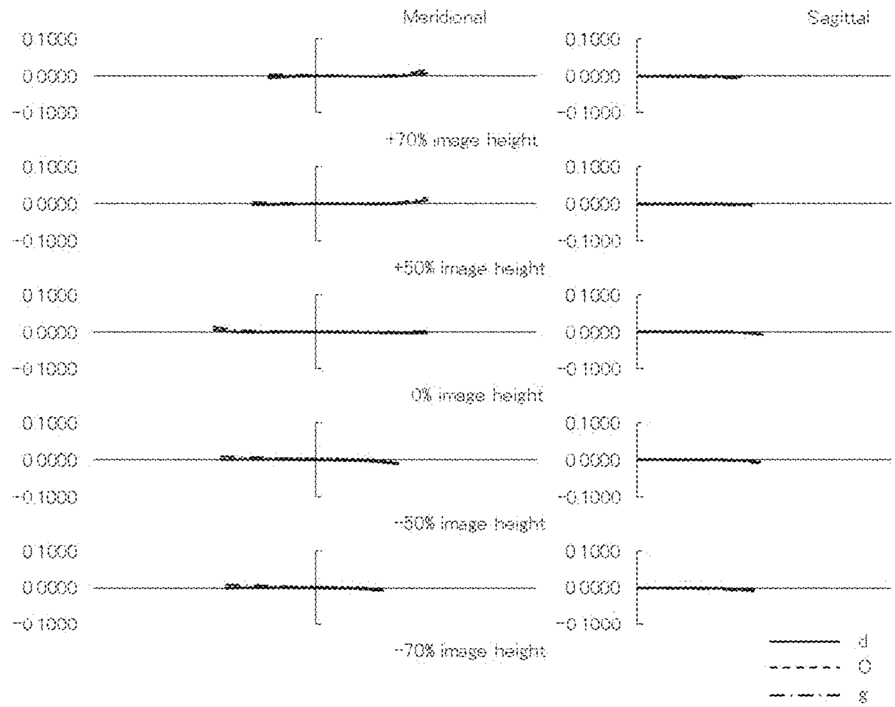
FIG. 12 is a lateral aberration diagram during 0.3° vibration control at infinity in Example 2 of the present invention.

FIG. 7 is a lens configuration diagram of the imaging optical system in Example 2 of the present invention. The first lens group G1 is configured to include a positive lens L1 with a biconvex shape, a meniscus-shaped positive lens L2 with a convex surface facing the object side, a meniscus-shaped negative lens L3 with a convex surface facing the object side, a meniscus-shape positive lens L4 with a convex surface facing the object side, a negative lens L5 with a biconcave shape, a positive lens L6 with a biconvex shape, and a cemented lens including a meniscus-shaped negative lens L7 with a convex surface facing the object side and a meniscus-shaped positive lens L8 with a convex surface facing the object side, and has a positive power as a whole. In addition, the first lens group G1 is constantly fixed relative to an image surface.

The second lens group G2 is configured to include a cemented lens including a meniscus-shaped positive lens L9 with a convex surface facing the object side and a meniscus-shaped negative lens L10 with a convex surface facing the object side, and has a negative power as a whole. In addition, the second lens group G2 moves on an optical axis from the object side toward the image side during focusing from an infinite distance object to a closer distance object.

The third lens group G3 is configured to include an image blur correction unit IU and a rear unit RU, and has a negative power as a whole. In addition, the third lens group G3 is fixed relative to the image surface during the focusing.

The image blur correction unit IU is configured to include a cemented lens including a positive lens L11 with a biconvex shape and a negative lens L12 with a biconcave shape, and a negative lens L13 with a biconcave shape, and has a negative power as a whole. In addition, the image blur correction unit IU moves in a direction perpendicular to the optical axis so as to reduce image blur due to blur of the imaging optical system.

The rear unit RU is configured to include a positive lens L14 with a biconvex shape, a cemented lens including a negative lens L15 with a biconcave shape and a meniscus-shaped positive lens L16 with a convex surface facing the object side, a three-cemented lens including a positive lens L17 with a biconvex shape, a negative lens L18 with a biconcave shape, and a positive lens L19 with a biconvex shape, and a meniscus-shaped negative lens L20 with a concave surface facing the object side, and has a negative power as a whole. In addition, the rear unit RU is constantly fixed relative to the image surface.

The aperture diaphragm S is disposed between the second lens group G2 and the third lens group G3. The lens component Ln disposed closest to the image side in the imaging optical system is the negative lens L20.

Example 3

Figure 13:
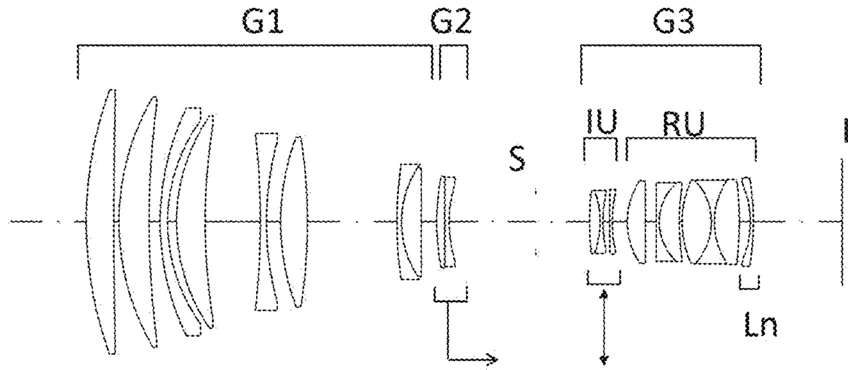
FIG. 13 is a lens configuration diagram at infinity in Example 3 of the present invention.
Figure 14:
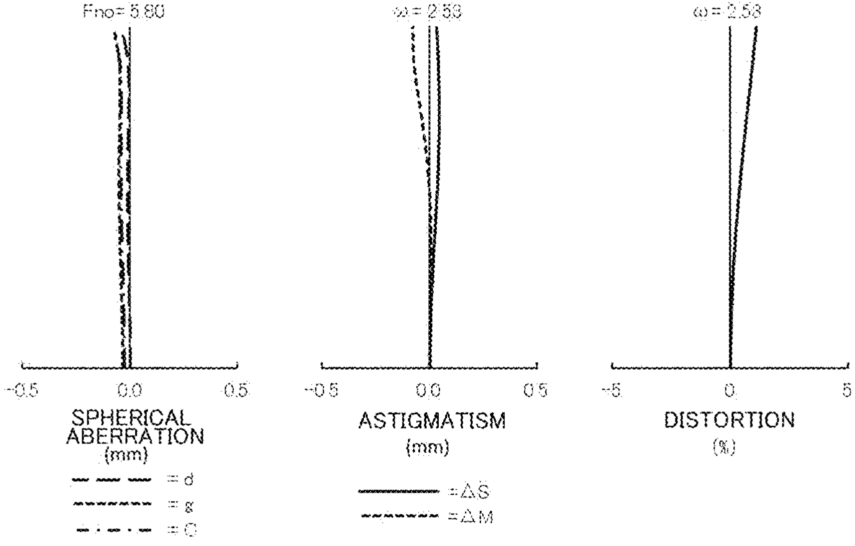
FIG. 14 is a longitudinal aberration diagram at infinity in Example 3 of the present invention.
Figure 15:
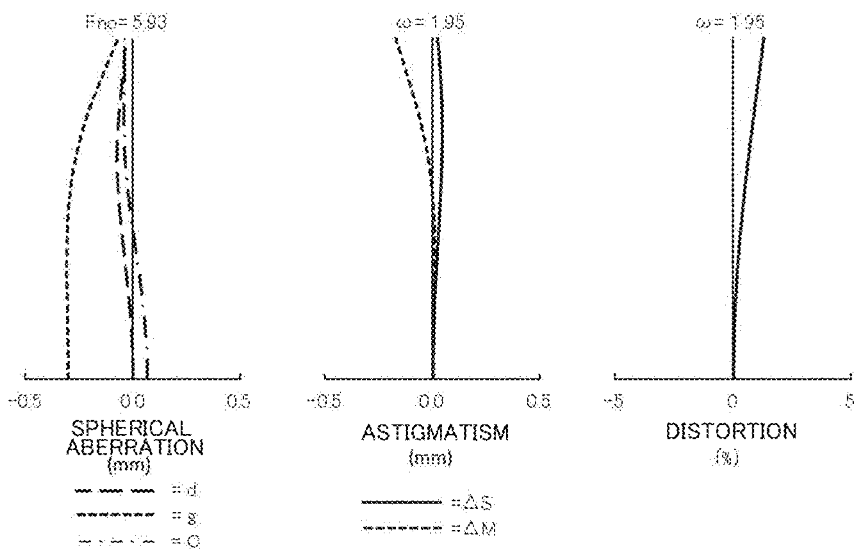
FIG. 15 is a longitudinal aberration diagram at a focusing distance of 3.1 m in Example 3 of the present invention.
Figure 16:
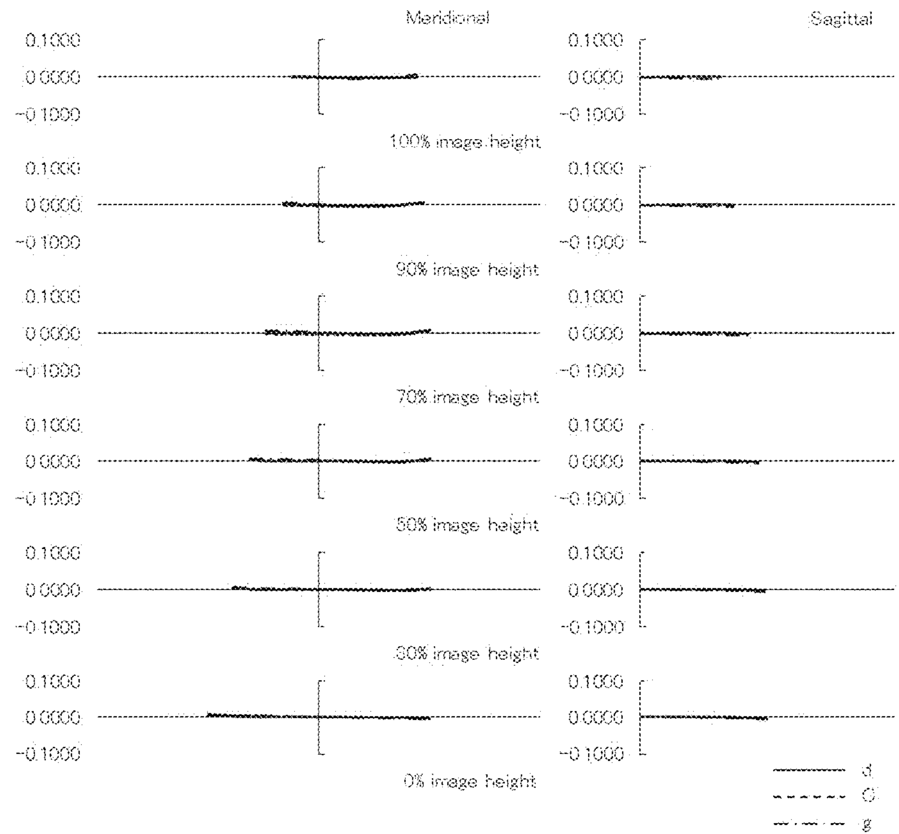
FIG. 16 is a lateral aberration diagram at infinity in Example 3 of the present invention.
Figure 17:
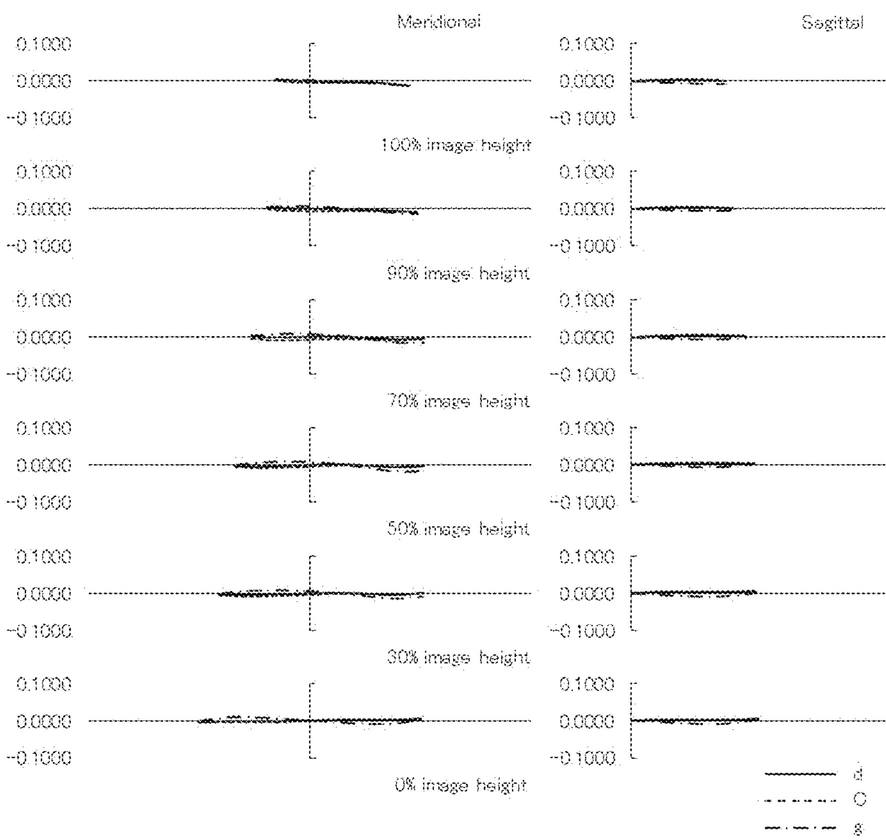
FIG. 17 is a lateral aberration diagram at a focusing distance of 3.1 m in Example 3 of the present invention.
Figure 18:
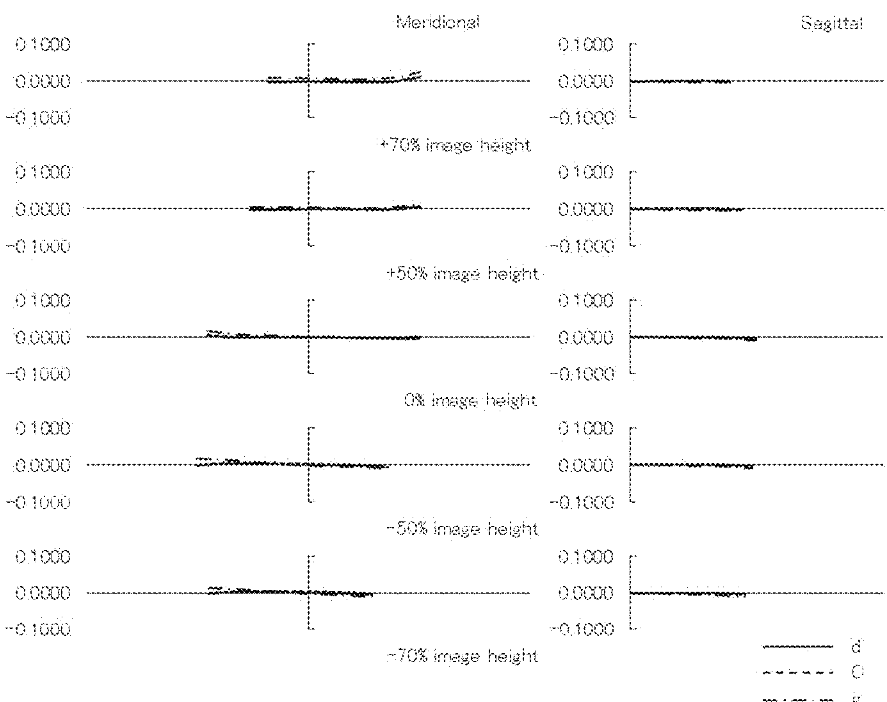
FIG. 18 is a lateral aberration diagram during 0.3° vibration control at infinity in Example 3 of the present invention.

FIG. 13 is a lens configuration diagram of the imaging optical system in Example 3 of the present invention. The first lens group G1 is configured to include a meniscus-shaped positive lens L1 with a convex surface facing the object side, a meniscus-shaped positive lens L2 with a convex surface facing the object side, a meniscus-shaped negative lens L3 with a concave surface facing the object side, a meniscus-shape positive lens L4 with a convex surface facing the object side, a negative lens L5 with a biconcave shape, a positive lens L6 with a biconvex shape, and a cemented lens including a meniscus-shaped negative lens L7 with a convex surface facing the object side and a meniscus-shaped positive lens L8 with a convex surface facing the object side, and has a positive power as a whole. In addition, the first lens group G1 is constantly fixed relative to an image surface.

The second lens group G2 is configured to include a cemented lens including a meniscus-shaped positive lens L9 with a convex surface facing the object side and a meniscus-shaped negative lens L10 with a convex surface facing the object side, and has a negative power as a whole. In addition, the second lens group G2 moves on an optical axis from the object side toward the image side during focusing from an infinite distance object to a closer distance object.

The third lens group G3 is configured to include an image blur correction unit IU and a rear unit RU, and has a negative power as a whole. In addition, the third lens group G3 is fixed relative to the image surface during the focusing.

The image blur correction unit IU is configured to include a cemented lens including a positive lens L11 with a biconvex shape and a negative lens L12 with a biconcave shape, and a meniscus-shaped negative lens L13 with a convex surface facing the object side, and has a negative power as a whole. In addition, the image blur correction unit IU moves in a direction perpendicular to the optical axis so as to reduce image blur due to blur of the imaging optical system.

The rear unit RU is configured to include a positive lens L14 with a biconvex shape, a cemented lens including a negative lens L15 with a biconcave shape and a meniscus-shaped positive lens L16 with a convex surface facing the object side, a three-cemented lens including a positive lens L17 with a biconvex shape, a negative lens L18 with a biconcave shape, and a positive lens L19 with a biconvex shape, and a meniscus-shaped negative lens L20 with a concave surface facing the object side, and has a negative power as a whole. In addition, the rear unit RU is constantly fixed relative to the image surface.

The aperture diaphragm S is disposed between the second lens group G2 and the third lens group G3. The lens component Ln disposed closest to the image side in the imaging optical system is a negative lens L20.

Example 4

Figure 19:
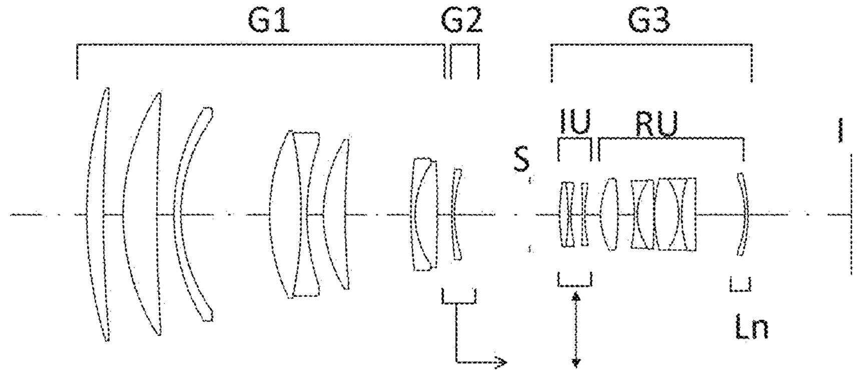
FIG. 19 is a lens configuration diagram at infinity in Example 4 of the present invention.
Figure 20:
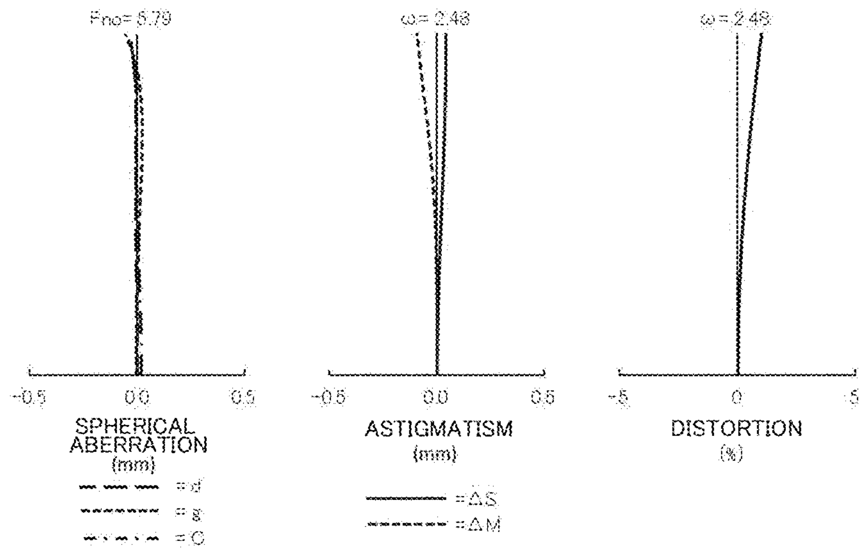
FIG. 20 is a longitudinal aberration diagram at infinity in Example 4 of the present invention.
Figure 21:
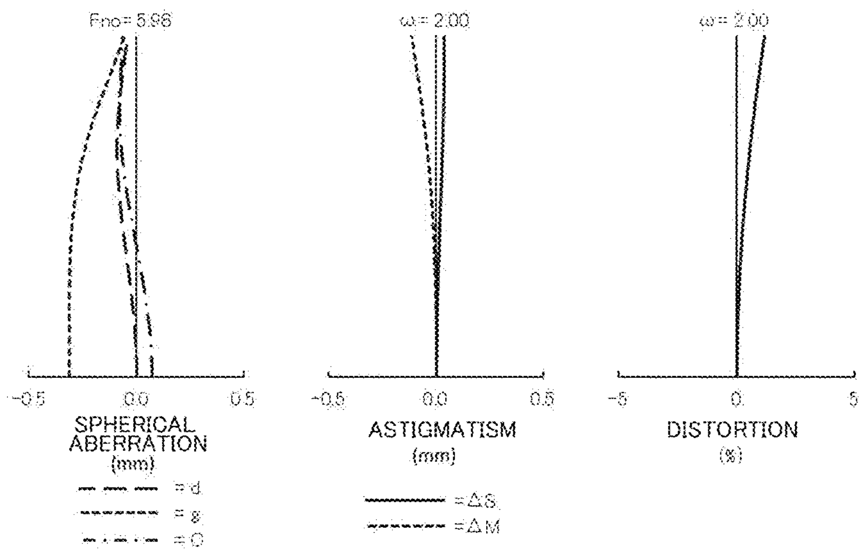
FIG. 21 is a longitudinal aberration diagram at a focusing distance of 3.2 m in Example 4 of the present invention.
Figure 22:
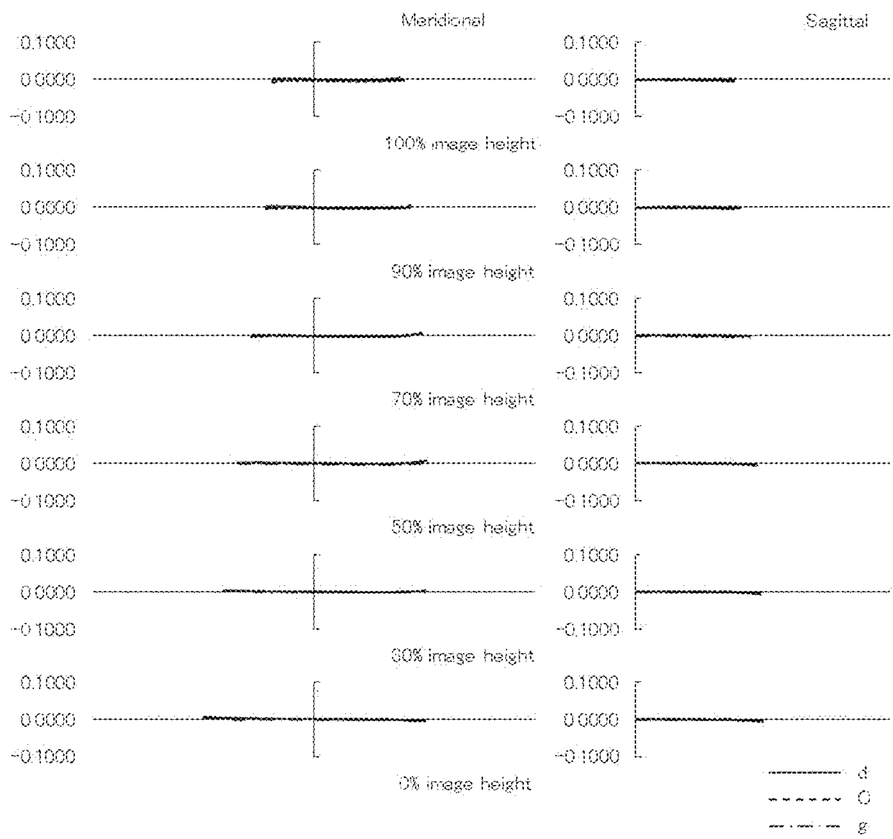
FIG. 22 is a lateral aberration diagram at infinity in Example 4 of the present invention.
Figure 23:
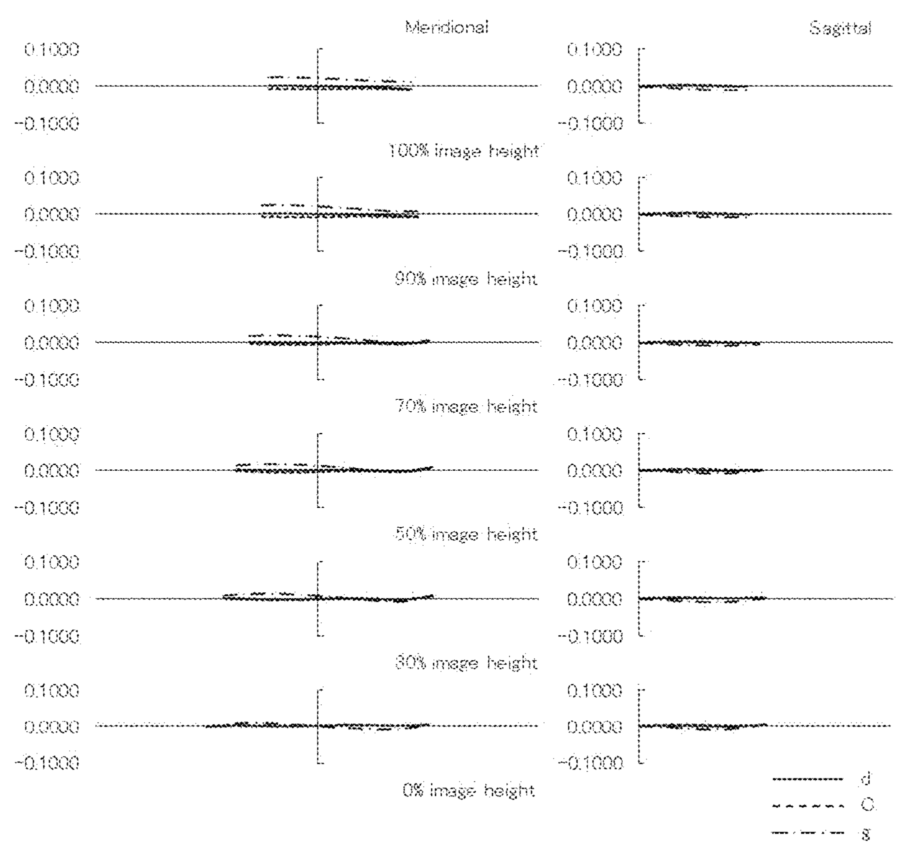
FIG. 23 is a lateral aberration diagram at a focusing distance of 3.2 m in Example 4 of the present invention.
Figure 24:
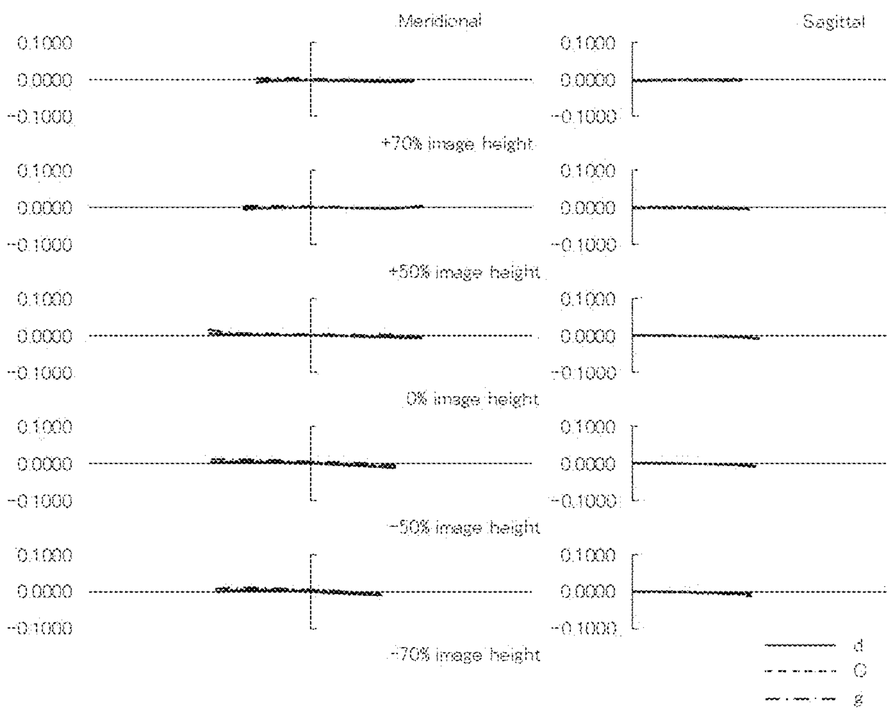
FIG. 24 is a lateral aberration diagram during 0.3° vibration control at infinity in Example 4 of the present invention.

FIG. 19 is a lens configuration diagram of the imaging optical system in Example 4 of the present invention. The first lens group G1 is configured to include a meniscus-shaped positive lens L1 with a convex surface facing the object side, the meniscus-shaped positive lens L2 with a convex surface facing the object side, a meniscus-shaped negative lens L3 with a convex surface facing the object side, a cemented lens including a positive lens L4 with a biconvex shape and a negative lens L5 with a biconcave shape, a meniscus-shaped positive lens L6 with a convex surface facing the object side, and a cemented lens including a meniscus-shaped negative lens L7 with a convex surface facing the object side and a positive lens L8 with a biconvex shape, and has a positive power as a whole. In addition, the first lens group G1 is constantly fixed relative to an image surface.

The second lens group G2 is configured to include a meniscus-shaped negative lens L9 with a convex surface facing the object side, and has a negative power as a whole. In addition, the second lens group G2 moves on an optical axis from the object side toward the image side during focusing from an infinite distance object to a closer distance object.

The third lens group G3 is configured to include an image blur correction unit IU and a rear unit RU, and has a negative power as a whole. In addition, the third lens group G3 is fixed relative to the image surface during the focusing.

The image blur correction unit IU is configured to include a cemented lens including a positive lens L10 with a biconvex shape and a negative lens L11 with a biconcave shape, and a negative lens L12 with a biconcave shape, and has a negative power as a whole. In addition, the image blur correction unit IU moves in a direction perpendicular to the optical axis so as to reduce image blur due to blur of the imaging optical system.

The rear unit RU is configured to include a positive lens L13 with a biconvex shape, a cemented lens including a negative lens L14 with a biconcave shape and a positive lens L15 with a biconvex shape, a three-cemented lens including a positive lens L16 with a biconvex shape, a negative lens L17 with a biconcave shape, and a meniscus-shaped positive lens L18 with a convex surface facing the object side, and a meniscus-shaped negative lens L19 with a concave surface facing the object side, and has a negative power as a whole. In addition, the rear unit RU is constantly fixed relative to the image surface.

The aperture diaphragm S is disposed between the second lens group G2 and the third lens group G3. The lens component Ln disposed closest to the image side in the imaging optical system is a negative lens L19.

Example 5

Figure 25:
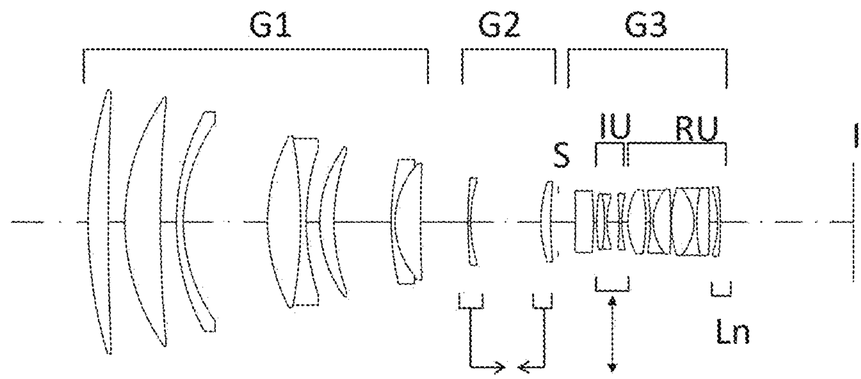
FIG. 25 is a lens configuration diagram at infinity in Example 5 of the present invention.
Figure 26:
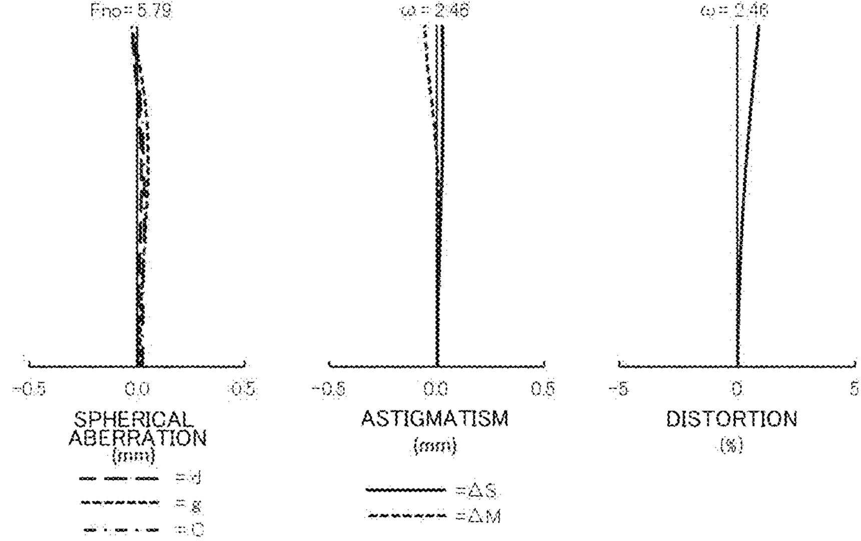
FIG. 26 is a longitudinal aberration diagram at infinity in Example 5 of the present invention.
Figure 27:
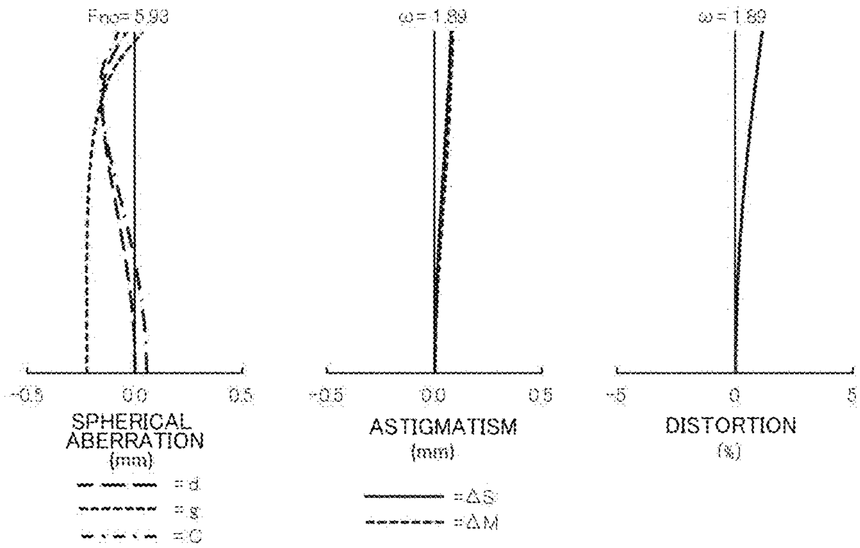
FIG. 27 is a longitudinal aberration diagram at a focusing distance of 3.3 m in Example 5 of the present invention.
Figure 28:
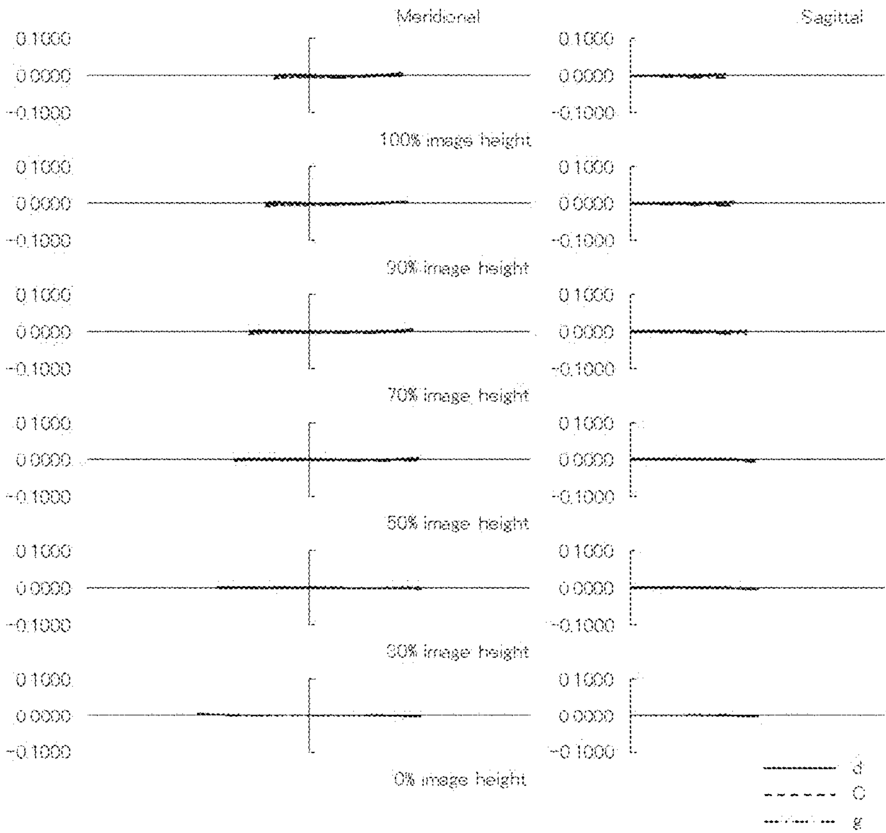
FIG. 28 is a lateral aberration diagram at infinity in Example 5 of the present invention.
Figure 29:
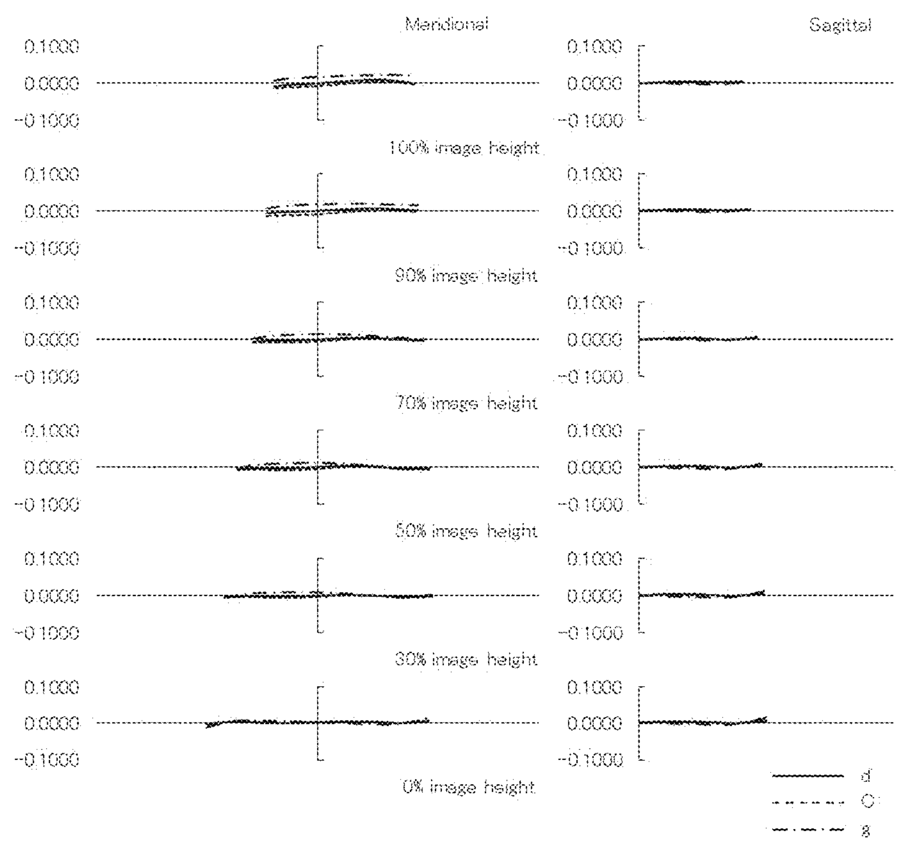
FIG. 29 is a lateral aberration diagram at a focusing distance of 3.3 m in Example 5 of the present invention.
Figure 30:
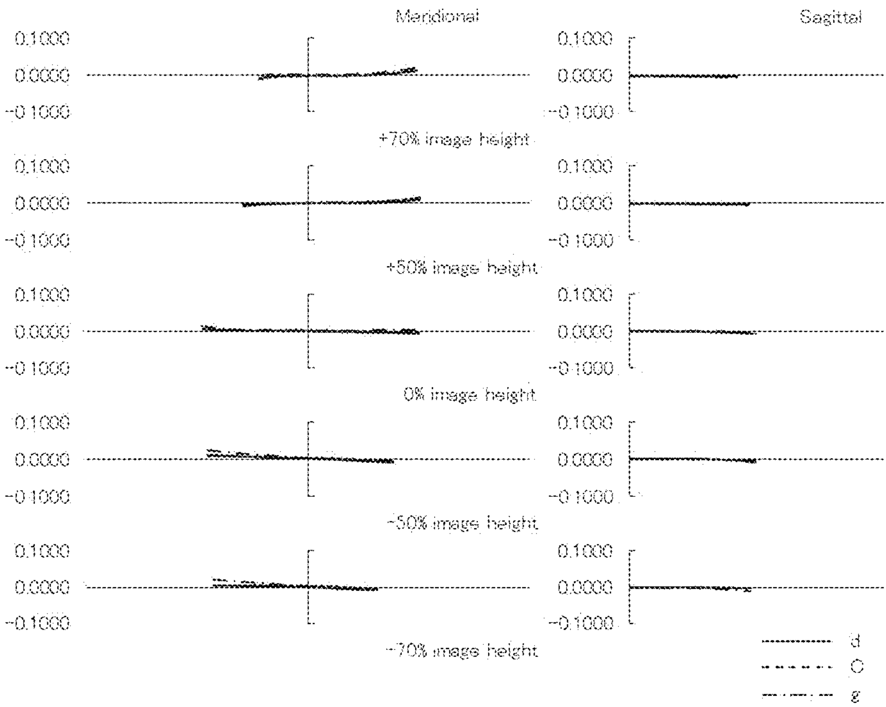
FIG. 30 is a lateral aberration diagram during 0.3° vibration control at infinity in Example 5 of the present invention.

FIG. 25 is a lens configuration diagram of the imaging optical system in Example 5 of the present invention. The first lens group G1 is configured to include a meniscus-shaped positive lens L1 with a convex surface facing the object side, a meniscus-shaped positive lens L2 with a convex surface facing the object side, a meniscus-shaped negative lens L3 with a convex surface facing the object side, a cemented lens including a positive lens L4 with a biconvex shape and a negative lens L5 with a biconcave shape, a meniscus-shaped positive lens L6 with a convex surface facing the object side, and a cemented lens including a meniscus-shaped negative lens L7 with a convex surface facing the object side and a meniscus-shaped positive lens L8 with a convex surface facing the object side, and has a positive power as a whole. In addition, the first lens group G1 is constantly fixed relative to an image surface.

The second lens group G2 is configured to include a meniscus-shaped negative lens L9 with a convex surface facing the object side and a meniscus-shaped positive lens L10 with a convex surface facing the object side, and has a negative power as a whole. In the second lens group G2, the lens L9 moves on an optical axis from the object side toward the image side during focusing from an infinite distance object to a closer distance object, while the lens L10 moves on the optical axis from the image side toward the object side during the focusing from the infinite distance object to the closer distance object.

The third lens group G3 is configured to include a lens component, an image blur correction unit IU, and a rear unit RU, and has a negative power as a whole. In addition, the third lens group G3 is fixed relative to the image surface during the focusing.

The lens component includes a meniscus-shaped positive lens L11 with a concave surface facing the object side.

The image blur correction unit IU is configured to include a cemented lens including a positive lens L12 with a biconvex shape and a negative lens L13 with a biconcave shape, and a negative lens L14 with a biconcave shape, and has a negative power as a whole. In addition, the image blur correction unit IU moves in a direction perpendicular to the optical axis so as to reduce image blur due to blur of the imaging optical system.

The rear unit RU is configured to include a positive lens L15 with a biconvex shape, a cemented lens including a negative lens L16 with a biconcave shape and a positive lens L17 with a biconvex shape, a three-cemented lens including a positive lens L18 with a biconvex shape, a negative lens L19 with a biconcave shape, and a positive lens L20 with a biconvex shape, and a meniscus-shaped negative lens L21 with a concave surface facing the object side, and has a negative power as a whole. In addition, the rear unit RU is constantly fixed relative to the image surface.

The aperture diaphragm S is disposed between the second lens group G2 and the third lens group G3. The lens component Ln disposed closest to the image side in the imaging optical system is a negative lens L21.

The following will show specific numerical data in each of the examples of the imaging optical system of the present invention described above.

In [Surface Data], a surface number indicates a number of a lens surface or an aperture diaphragm which is counted from the object side, r denotes a curvature radius of each surface, d denotes a distance between the individual surfaces, nd denotes a refractive index to the d-line (at a wavelength of 587.56 nm), vd denotes an Abbe number to the d-line, and P_gF denotes a partial dispersion ratio to the g-line and the F-line.

BF represents back focus.

(Diaphragm) added to the surface number indicates that an aperture diaphragm is located at that position. For a curvature radius to a plane or an aperture diaphragm, ∞ (infinity) is filled in.

[Various Data] shows values of focal lengths and the like when the focusing distance is INF, 20 m, and 3.2 m.

[Variable Distance Data] shows variable distances and BF values when the focusing distance is INF, 20 m, and 3.2 m.

[Lens Group Data] shows a number of the surface configured to be included in each of the lens groups and closest to the object side and a composite focal length of the entire group.

For all values of specifications described below, millimeter (mm) is used as the unit for the focal length f, the curvature radius r, the lens surface distance d, and other lengths each shown therein unless otherwise particularly specified. However, in an optical system, equivalent optical performances can be obtained even in proportional enlargement and proportional reduction, and therefore the unit is not limited thereto.

In addition, a list of corresponding values of the conditional expressions in each of these examples is shown.

In the aberration diagrams corresponding to the respective examples, "d", "g", and "C" respectively represent the d-line, the g-line, and the C-line, while "ΔS" and "ΔM" represent a sagittal image surface and a meridional image surface.

Numerical Example 1

Unit: mm

[Surface Data]

| Surface Number | r | d | nd | vd | P_gF |
|---|---|---|---|---|---|
| Object Surface | ∞ | (d0) | | | |
| 1 | 128.6213 | 8.5472 | 1.49700 | 81.61 | 0.5389 |
| 2 | 1855.0184 | 0.2257 | | | |
| 3 | 82.1712 | 9.8467 | 1.43700 | 95.10 | 0.5336 |
| 4 | 291.1918 | 3.7000 | | | |
| 5 | 86.2308 | 2.5000 | 1.77250 | 49.63 | 0.5504 |
| 6 | 57.9504 | 3.3543 | | | |
| 7 | 61.4411 | 9.6400 | 1.43700 | 95.10 | 0.5336 |
| 8 | 197.3978 | 18.5622 | | | |
| 9 | −333.8043 | 2.0000 | 1.77250 | 49.63 | 0.5504 |
| 10 | 93.3984 | 0.3617 | | | |
| 11 | 73.6505 | 9.0058 | 1.43700 | 95.10 | 0.5336 |
| 12 | −256.0975 | 29.8177 | | | |
| 13 | 126.7983 | 1.5000 | 1.77250 | 49.63 | 0.5504 |
| 14 | 32.4202 | 6.7928 | 1.56732 | 42.84 | 0.5744 |
| 15 | 614.6770 | (d15) | | | |
| 16 | 91.7650 | 2.6326 | 1.67270 | 32.17 | 0.5963 |
| 17 | 5455.7778 | 1.5000 | 1.77250 | 49.63 | 0.5504 |
| 18 | 49.7976 | (d18) | | | |
| 19 (Diaphragm) | ∞ | 14.3265 | | | |
| 20 | 115.6881 | 3.1058 | 1.67270 | 32.17 | 0.5963 |
| 21 | −37.9788 | 1.0000 | 1.59282 | 68.62 | 0.5440 |
| 22 | 70.0614 | 2.1219 | | | |
| 23 | −243.6318 | 0.9000 | 1.88300 | 40.81 | 0.5656 |
| 24 | 47.2089 | 5.8618 | | | |
| 25 | 28.0943 | 5.4009 | 1.68960 | 31.14 | 0.6031 |
| 26 | −1449.5194 | 5.0141 | | | |
| 27 | −357.0678 | 1.0000 | 1.94594 | 17.98 | 0.6546 |
| 28 | 21.1709 | 5.9068 | 1.69895 | 30.05 | 0.6028 |
| 29 | 149.0456 | 2.9324 | | | |
| 30 | 41.7292 | 10.1981 | 1.75520 | 27.53 | 0.6098 |
| 31 | −22.5524 | 1.0000 | 1.88300 | 40.81 | 0.5656 |
| 32 | 31.9918 | 7.5209 | 1.77047 | 29.74 | 0.5951 |
| 33 | −92.9755 | 3.7907 | | | |
| 34 | −34.1613 | 1.0000 | 1.90043 | 37.37 | 0.5767 |
| 35 | −86.9114 | (BF) | | | |
| Image Surface | ∞ | | | | |

[Various Data]

| | INF | 20 m | 3.2 m |
|---|---|---|---|
| Focal Length | 485.00 | 429.90 | 258.32 |
| F-Number | 5.80 | 5.80 | 5.95 |
| Entire Angle Of View 2ω | 5.06 | 4.88 | 3.95 |
| Image Height Y | 21.63 | 21.63 | 21.63 |
| Entire Lens Length | 252.34 | 252.34 | 252.34 |

[Variable Distance Data]

| | INF | 20 m | 3.2 m |
|---|---|---|---|
| d0 | ∞ | 19410.1882 | 2898.0257 |
| d15 | 5.1467 | 7.4232 | 21.9757 |
| d18 | 28.9503 | 26.6738 | 12.1213 |
| BF | 37.1732 | 37.1732 | 37.1732 |

| [Lens Group Data] | | |
|---|---|---|
| Group | Starting Surface | Focal Length |
| G1 | 1 | 171.54 |
| G2 | 16 | −126.77 |
| G3 | 20 | −78.05 |
| IU | 20 | −44.51 |
| RU | 25 | 65.16 |
| Ln | 34 | −63.07 |

Numerical Example 2

Unit: mm

| [Surface Data] | | | | | |
|---|---|---|---|---|---|
| Surface Number | r | d | nd | vd | P_gF |
| Object Surface | ∞ | (d0) | | | |
| 1 | 140.7884 | 9.2799 | 1.49700 | 81.61 | 0.5389 |
| 2 | −2983.6838 | 1.3052 | | | |
| 3 | 80.6730 | 10.2729 | 1.43700 | 95.10 | 0.5336 |
| 4 | 267.2084 | 3.7000 | | | |
| 5 | 88.2176 | 2.5000 | 1.77250 | 49.63 | 0.5504 |
| 6 | 58.6143 | 3.0731 | | | |
| 7 | 61.1979 | 9.6400 | 1.43700 | 95.10 | 0.5336 |
| 8 | 174.3498 | 18.5785 | | | |
| 9 | −346.0581 | 2.0000 | 1.77250 | 49.63 | 0.5504 |
| 10 | 96.0936 | 3.5160 | | | |
| 11 | 75.0504 | 9.2576 | 1.43700 | 95.10 | 0.5336 |
| 12 | −256.0553 | 30.4691 | | | |
| 13 | 179.2783 | 1.5000 | 1.77250 | 49.63 | 0.5504 |
| 14 | 33.6244 | 7.0233 | 1.56732 | 42.84 | 0.5744 |
| 15 | 1876.2500 | (d15) | | | |
| 16 | 91.4634 | 2.6101 | 1.67270 | 32.17 | 0.5963 |
| 17 | 430.5662 | 1.5000 | 1.77250 | 49.63 | 0.5504 |
| 18 | 52.4328 | (d18) | | | |
| 19 (Diaphragm) | ∞ | 8.9386 | | | |
| 20 | 47.2400 | 3.5406 | 1.64769 | 33.84 | 0.5924 |
| 21 | −53.3700 | 1.0000 | 1.59410 | 60.47 | 0.5552 |
| 22 | 36.8596 | 2.7076 | | | |
| 23 | −470.0733 | 0.9000 | 1.88300 | 40.81 | 0.5656 |
| 24 | 52.0060 | 5.5310 | | | |
| 25 | 30.1323 | 4.7326 | 1.69895 | 30.05 | 0.6028 |
| 26 | −167.2045 | 4.5845 | | | |
| 27 | −137.6655 | 1.0000 | 1.92286 | 20.88 | 0.6390 |
| 28 | 20.9954 | 4.5531 | 1.72047 | 34.71 | 0.5834 |
| 29 | 95.3035 | 5.3990 | | | |
| 30 | 49.7673 | 7.9623 | 1.77047 | 29.74 | 0.5951 |
| 31 | −24.7722 | 1.0000 | 1.88100 | 40.14 | 0.5700 |

-continued

| [Surface Data] | | | | | |
|---|---|---|---|---|---|
| Surface Number | r | d | nd | vd | P_gF |
| 32 | 33.7336 | 5.5745 | 1.77047 | 29.74 | 0.5951 |
| 33 | −101.9666 | 2.4752 | | | |
| 34 | −41.3845 | 1.0000 | 1.91082 | 35.25 | 0.5822 |
| 35 | −88.8866 | (BF) | | | |
| Image Surface | ∞ | | | | |

| [Various Data] | | | |
|---|---|---|---|
| | INF | 20 m | 3.3 m |
| Focal Length | 504.99 | 455.35 | 287.93 |
| F-Number | 5.80 | 5.81 | 5.81 |
| Entire Angle Of View 2ω | 4.87 | 4.69 | 3.81 |
| Image Height Y | 21.63 | 21.63 | 21.63 |
| Entire Lens Length | 261.95 | 261.95 | 261.95 |

| [Variable Distance Data] | | | |
|---|---|---|---|
| | INF | 20 m | 3.2 m |
| d0 | ∞ | 20213.4581 | 3014.6257 |
| d15 | 4.9136 | 7.6311 | 25.3377 |
| d18 | 29.7949 | 27.0774 | 9.3709 |
| BF | 50.1169 | 50.1169 | 50.1170 |

| [Lens Group Data] | | |
|---|---|---|
| Group | Starting Surface | Focal Length |
| G1 | 1 | 187.32 |
| G2 | 16 | −145.23 |
| G3 | 20 | −102.31 |
| IU | 20 | −52.63 |
| RU | 25 | 79.76 |
| Ln | 34 | −85.88 |

Numerical Example 3

Unit: mm

| [Surface Data] | | | | | |
|---|---|---|---|---|---|
| Surface Number | r | d | nd | vd | P_gF |
| Object Surface | ∞ | (d0) | | | |
| 1 | 129.1671 | 9.3042 | 1.49700 | 81.61 | 0.5389 |
| 2 | 1997.2381 | 1.6817 | | | |
| 3 | 83.2780 | 10.1121 | 1.43700 | 95.10 | 0.5336 |
| 4 | 308.2174 | 3.7000 | | | |
| 5 | 87.5533 | 2.5000 | 1.77250 | 49.63 | 0.5504 |
| 6 | 58.3974 | 2.9835 | | | |
| 7 | 62.7900 | 9.6400 | 1.43700 | 95.10 | 0.5336 |
| 8 | 211.2563 | 18.5318 | | | |
| 9 | −251.1669 | 2.0000 | 1.77250 | 49.63 | 0.5504 |
| 10 | 102.3545 | 4.7635 | | | |
| 11 | 80.9017 | 8.9888 | 1.43700 | 95.10 | 0.5336 |
| 12 | −185.6506 | 30.0422 | | | |
| 13 | 135.3400 | 1.5000 | 1.77250 | 49.63 | 0.5504 |
| 14 | 33.5732 | 6.7076 | 1.56732 | 42.84 | 0.5744 |
| 15 | 8516.1691 | (d15) | | | |

-continued

| [Surface Data] | | | | | |
|---|---|---|---|---|---|
| Surface Number | r | d | nd | vd | P_gF |
| 16 | 85.4947 | 2.6556 | 1.68960 | 31.14 | 0.6031 |
| 17 | 2193.1449 | 1.5000 | 1.77250 | 49.63 | 0.5504 |
| 18 | 45.4644 | (d18) | | | |
| 19 (Diaphragm) | ∞ | 18.0876 | | | |
| 20 | 104.0250 | 3.4744 | 1.62004 | 36.26 | 0.5922 |
| 21 | −31.6896 | 1.0000 | 1.61997 | 63.88 | 0.5426 |
| 22 | 47.0550 | 2.2173 | | | |
| 23 | 964.2787 | 0.9000 | 1.88300 | 40.81 | 0.5656 |
| 24 | 46.1161 | 5.0266 | | | |
| 25 | 25.6649 | 6.0771 | 1.67270 | 32.17 | 0.5963 |
| 26 | −1312.8296 | 3.6458 | | | |
| 27 | −2120.5231 | 1.0000 | 1.94594 | 17.98 | 0.6546 |
| 28 | 18.2224 | 6.7476 | 1.69895 | 30.05 | 0.6028 |
| 29 | 88.4439 | 0.9216 | | | |
| 30 | 34.2077 | 9.8217 | 1.75520 | 27.53 | 0.6098 |
| 31 | −20.9612 | 1.0000 | 1.88300 | 40.81 | 0.5656 |
| 32 | 25.4542 | 8.3904 | 1.75520 | 27.53 | 0.6098 |
| 33 | −106.2780 | 3.6661 | | | |
| 34 | −33.3334 | 1.0000 | 1.90043 | 37.37 | 0.5767 |
| 35 | −89.4967 | (BF) | | | |
| Image Surface | ∞ | | | | |

| [Various Data] | | | |
|---|---|---|---|
| | INF | 20 m | 3.3 m |
| Focal Length | 485.01 | 420.05 | 236.23 |
| F-Number | 5.80 | 5.80 | 5.93 |
| Entire Angle Of View 2ω | 5.05 | 4.86 | 3.91 |
| Image Height Y | 21.63 | 21.63 | 21.63 |
| Entire Lens Length | 253.59 | 253.59 | 253.59 |

| [Variable Distance Data] | | | |
|---|---|---|---|
| | INF | 20 m | 3.2 m |
| d0 | ∞ | 19388.4694 | 2878.0087 |
| d15 | 5.1495 | 7.2432 | 20.5336 |
| d18 | 29.0361 | 26.9423 | 13.6519 |
| BF | 29.8213 | 29.8213 | 29.8213 |

| [Lens Group Data] | | |
|---|---|---|
| Group | Starting Surface | Focal Length |
| G1 | 1 | 166.46 |
| G2 | 16 | −116.88 |
| G3 | 20 | −61.29 |
| IU | 20 | −40.99 |
| RU | 25 | 62.41 |
| Ln | 34 | −59.49 |

Numerical Example 4

Unit: mm

| [Surface Data] | | | | | |
|---|---|---|---|---|---|
| Surface Number | r | d | nd | vd | P_gF |
| Object Surface | ∞ | (d0) | | | |
| 1 | 152.6407 | 5.9639 | 1.49700 | 81.61 | 0.5389 |
| 2 | 479.5683 | 6.9529 | | | |
| 3 | 80.8597 | 11.9755 | 1.43700 | 95.10 | 0.5336 |
| 4 | 585.1357 | 6.0275 | | | |
| 5 | 72.6166 | 2.5000 | 1.69680 | 55.46 | 0.5426 |
| 6 | 58.8047 | 31.4706 | | | |
| 7 | 68.7654 | 11.2371 | 1.43700 | 95.10 | 0.5336 |
| 8 | −142.8542 | 2.0000 | 1.77250 | 49.63 | 0.5504 |
| 9 | 77.6483 | 5.8849 | | | |
| 10 | 50.6036 | 7.7034 | 1.43700 | 95.10 | 0.5336 |
| 11 | 255.1568 | 23.4115 | | | |
| 12 | 169.1233 | 1.4000 | 1.88300 | 40.81 | 0.5656 |
| 13 | 31.9189 | 7.9145 | 1.62004 | 36.30 | 0.5873 |
| 14 | −406.6786 | (d14) | | | |
| 15 | 131.6201 | 0.9000 | 1.49700 | 81.61 | 0.5389 |
| 16 | 45.7614 | (d16) | | | |
| 17 (Diaphragm) | ∞ | 10.6662 | | | |
| 18 | 77.1288 | 3.0224 | 1.77047 | 29.74 | 0.5951 |
| 19 | −69.5028 | 0.9000 | 1.59282 | 68.62 | 0.5440 |

-continued

| [Surface Data] | | | | | |
|---|---|---|---|---|---|
| Surface Number | r | d | nd | vd | P_gF |
| 20 | 47.7243 | 4.0951 | | | |
| 21 | −266.3337 | 0.9000 | 1.88300 | 40.81 | 0.5656 |
| 22 | 50.7912 | 5.5666 | | | |
| 23 | 28.3565 | 6.1268 | 1.67270 | 32.17 | 0.5963 |
| 24 | −106.0047 | 5.8834 | | | |
| 25 | −62.5186 | 1.0000 | 1.94594 | 17.98 | 0.6546 |
| 26 | 21.1671 | 5.8948 | 1.67270 | 32.17 | 0.5963 |
| 27 | −301.0473 | 0.2000 | | | |
| 28 | 48.3691 | 8.6180 | 1.80809 | 22.76 | 0.6287 |
| 29 | −22.9490 | 1.0000 | 1.88300 | 40.81 | 0.5656 |
| 30 | 43.1894 | 4.9693 | 1.75520 | 27.53 | 0.6098 |
| 31 | 674.8222 | 17.5497 | | | |
| 32 | −34.2110 | 1.0000 | 1.90043 | 37.37 | 0.5767 |
| 33 | −54.5225 | (BF) | | | |
| Image Surface | ∞ | | | | |

| [Various Data] | | | |
|---|---|---|---|
| | INF | 20 m | 3.3 m |
| Focal Length | 494.99 | 436.96 | 259.71 |
| F-Number | 5.79 | 5.79 | 5.98 |
| Entire Angle Of View 2ω | 4.95 | 4.80 | 4.00 |
| Image Height Y | 21.63 | 21.63 | 21.63 |
| Entire Lens Length | 271.35 | 271.35 | 271.35 |

| [Variable Distance Data] | | | |
|---|---|---|---|
| | INF | 20 m | 3.2 m |
| d0 | ∞ | 19802.1759 | 2952.4687 |
| d14 | 5.1657 | 7.5881 | 22.9611 |
| d16 | 26.7072 | 24.2849 | 8.9118 |
| BF | 36.7468 | 36.7468 | 36.7468 |

| [Lens Group Data] | | |
|---|---|---|
| Group | Starting Surface | Focal Length |
| G1 | 1 | 178.94 |
| G2 | 15 | −141.64 |
| G3 | 18 | −76.68 |
| IU | 18 | −50.47 |
| RU | 23 | 63.88 |
| Ln | 32 | −104.42 |

Numerical Example 5

Unit: mm

| [Surface Data] | | | | | |
|---|---|---|---|---|---|
| Surface Number | r | d | nd | vd | P_gF |
| Object Surface | ∞ | (d0) | | | |
| 1 | 165.9553 | 7.2259 | 1.49700 | 81.61 | 0.5389 |
| 2 | 1118.6991 | 5.9139 | | | |
| 3 | 78.0278 | 12.7478 | 1.43700 | 95.10 | 0.5336 |
| 4 | 454.9471 | 5.7283 | | | |
| 5 | 82.0549 | 2.5000 | 1.69680 | 55.46 | 0.5426 |
| 6 | 61.6396 | 30.2069 | | | |
| 7 | 65.9390 | 11.8209 | 1.43700 | 95.10 | 0.5336 |
| 8 | −166.5051 | 2.0000 | 1.77250 | 49.63 | 0.5504 |
| 9 | 82.4791 | 4.8154 | | | |
| 10 | 45.3814 | 5.1733 | 1.43700 | 95.10 | 0.5336 |
| 11 | 73.3250 | 20.4403 | | | |
| 12 | 93.6788 | 1.4000 | 1.87070 | 40.73 | 0.5682 |
| 13 | 31.0049 | 9.1421 | 1.62004 | 36.30 | 0.5873 |
| 14 | 429.8293 | (d14) | | | |
| 15 | 175.7816 | 0.9000 | 1.49700 | 81.61 | 0.5389 |
| 16 | 47.6860 | (d16) | | | |
| 17 | 46.7191 | 3.4927 | 1.43700 | 95.10 | 0.5336 |
| 18 | 128.7495 | (d18) | | | |
| 19 (Diaphragm) | ∞ | 6.1727 | | | |
| 20 | −479.9920 | 6.4679 | 1.43700 | 95.10 | 0.5336 |
| 21 | −115.9436 | 1.1220 | | | |
| 22 | 67.7872 | 2.8066 | 1.72825 | 28.32 | 0.6075 |
| 23 | −60.9571 | 0.9000 | 1.59282 | 68.62 | 0.5440 |
| 24 | 28.4378 | 4.3934 | | | |
| 25 | −107.6193 | 0.9000 | 1.87070 | 40.73 | 0.5682 |

-continued

| [Surface Data] | | | | | |
|---|---|---|---|---|---|
| Surface Number | r | d | nd | vd | P_gF |
| 26 | 42.1364 | 2.2000 | | | |
| 27 | 24.7730 | 6.4089 | 1.73037 | 32.23 | 0.5899 |
| 28 | −60.2057 | 1.6700 | | | |
| 29 | −56.4289 | 1.0000 | 1.94594 | 17.98 | 0.6546 |
| 30 | 18.0984 | 6.2978 | 1.67270 | 32.17 | 0.5963 |
| 31 | −213.9943 | 0.2000 | | | |
| 32 | 40.9517 | 8.1326 | 1.80809 | 22.76 | 0.6287 |
| 33 | −18.5101 | 1.0000 | 1.88300 | 40.81 | 0.5656 |
| 34 | 66.1994 | 4.4519 | 1.75211 | 25.05 | 0.6192 |
| 35 | −346.0767 | 3.0030 | | | |
| 36 | −37.3060 | 1.0000 | 1.90043 | 37.37 | 0.5767 |
| 37 | −123.7684 | (BF) | | | |
| Image Surface | ∞ | | | | |

| [Various Data] | | | |
|---|---|---|---|
| | INF | 20 m | 3.3 m |
| Focal Length | 499.98 | 442.50 | 265.66 |
| F-Number | 5.79 | 5.79 | 5.93 |
| Entire Angle Of View 2ω | 4.91 | 4.73 | 3.77 |
| Image Height Y | 21.63 | 21.63 | 21.63 |
| Entire Lens Length | 274.28 | 274.28 | 274.28 |

| [Variable Distance Data] | | | |
|---|---|---|---|
| | INF | 20 m | 3.2 m |
| d0 | ∞ | 19999.9799 | 3016.4353 |
| d14 | 17.0185 | 18.9756 | 27.2466 |
| d16 | 25.2166 | 21.9800 | 1.8334 |
| d18 | 2.7269 | 4.0065 | 15.8821 |
| BF | 47.6862 | 47.6863 | 47.6863 |

| [Lens Group Data] | | |
|---|---|---|
| Group | Starting Surface | Focal Length |
| G1 | 1 | 199.97 |
| G2 | 15 | −2175.01 |
| G3 | 20 | −51.85 |
| IU | 22 | −27.37 |
| RU | 27 | 46.46 |
| Ln | 36 | −59.63 |

| [Values Corresponding to Conditional Expressions] | | | | | |
|---|---|---|---|---|---|
| Conditional Expressions | Ex1 | Ex2 | Ex3 | Ex4 | Ex5 |
| (1) Φ_G2G3/Φ | −13.30 | −10.53 | −16.83 | −13.59 | −11.77 |
| (2) D_EXP/H_Img | 3.41 | 4.02 | 2.93 | 3.48 | 3.47 |
| (3) LT/f | 0.52 | 0.52 | 0.52 | 0.55 | 0.55 |
| (4) Φ_Ln/Φ | −7.69 | −5.88 | −8.15 | −4.74 | −8.38 |
| (5) Φ_G3/Φ | −6.21 | −4.94 | −7.91 | −6.46 | −9.64 |
| (6) \| Φ_OS/Φ \| | 10.90 | 9.59 | 11.83 | 9.81 | 18.27 |
| (7) D_pn/LT | 0.088 | 0.094 | 0.098 | 0.114 | 0.115 |
| (8) Φ_G2/Φ | −3.83 | −3.48 | −4.15 | −3.49 | −0.23 |
| (9) v_d | 17.98 | 20.88 | 17.98 | 17.98 | 17.98 |
| (10) P_gF+0.0018*v_d-0.6483 | 0.039 | 0.028 | 0.039 | 0.039 | 0.039 |

REFERENCE SIGNS LIST

G1 First lens group
G2 Second lens group
G3 Third lens group
IU Image blur correction unit
RU Rear unit
Ln Lens component disposed closest to image side
S Aperture diaphragm
I Image surface

What is claimed is:

1. An imaging optical system comprising, in order from an object side toward an image side:

a first lens group G1 having a positive power as a whole, a second lens group G2 including a lens that moves on an optical axis during focusing, and a third lens group G3 having a power, wherein following conditional expressions below are satisfied:

$$-34.00 < \Phi\_G2G3/\Phi < -6.60 \quad (1)$$

$$1.00 < D\_EXP/H\_Img < 4.60 \quad (2)$$

$$0.40 < LT/f < 1.00 \quad (3)$$

where

Φ denotes power of the imaging optical system when focusing on infinity,

Φ_G2G3 denotes composite power of the second lens group G2 and the third lens group G3 when focusing on infinity, $D\_EXP$ denotes a distance on the optical axis from an exit pupil to an image surface in the imaging optical system when focusing on infinity, $H\_Img$ denotes a maximum image height, LT denotes a distance on the optical axis from a surface closest to the object side to the image surface in the imaging optical system when focusing on infinity, and f denotes a focal length of the imaging optical system when focusing on infinity.

2. The imaging optical system according to claim 1, wherein, when a lens component is a single lens or a cemented lens, a lens component Ln disposed closest to the image side has a negative power and satisfies a conditional expression below:

$$-20.00 < \Phi\_Ln/\Phi < -0.01 \tag{4}$$

where $\Phi\_Ln$ denotes power of the lens component Ln disposed closest to the image side in the imaging optical system.

3. The imaging optical system according to claim 1, wherein a conditional expression below is satisfied:

$$-20.00 < \Phi\_G3/\Phi < -1.00 \tag{5}$$

where $\Phi\_G3$ denotes the power of the third lens group G3.

4. The imaging optical system according to claim 1, wherein the third lens group G3 has an image blur correction unit and has a rear unit on the image side of the image blur correction unit, respective powers of the image blur correction unit and the rear unit have different signs, and a conditional expression below is satisfied:

$$3.00 < |\Phi\_OS/\Phi| < 35.00 \tag{6}$$

where $\Phi\_OS$ denotes the power of the image blur correction unit.

5. The imaging optical system according to claim 1, wherein the third lens group G3 has an image blur correction unit and has a rear unit on the image side of the image blur correction unit, and the image blur correction unit has at least one positive lens and at least one negative lens.

6. The imaging optical system according to claim 1, further comprising:

an aperture diaphragm, wherein the aperture diaphragm is disposed on the image side of the first lens group G1.

7. The imaging optical system according to claim 1, further comprising: an aperture diaphragm, wherein the aperture diaphragm is disposed between the second lens group G2 and the third lens group G3.

8. The imaging optical system according to claim 1, wherein a conditional expression below is satisfied:

$$0.040 < D\_pn/LT < 0.40 \tag{7}$$

where $D\_pn$ denotes a distance on the optical axis from an object-side lens surface of a lens disposed closest to the object side to an object-side lens surface of a negative lens disposed closest to the object side on the image surface side of the lens in the imaging optical system.

9. The imaging optical system according to claim 1, wherein a conditional expression below is satisfied:

$$-12.00 < \Phi\_G2/\Phi < -0.13 \tag{8}$$

where $\Phi\_G2$ denotes power of the second lens group G2.

10. The imaging optical system according to claim 1, further comprising:

an aperture diaphragm and a negative lens satisfying conditional expressions below on the image side of the aperture diaphragm:

$$10.00 < v\_d < 30.00 \tag{9}$$

$$0.020 < P\_gF + 0.0018 * v\_d - 0.6483 < 0.080 \tag{10}$$

where $v_d$ denotes an Abbe number of the negative lens disposed on the image side of the aperture diaphragm relating to a d-line, $P\_gF$ denotes a partial dispersion ratio of the negative lens disposed on the image side of the aperture diaphragm relative to a g-line and an F-line, $P\_gF=(ng-nF)/(nF-nC)$ defines the partial dispersion ratio as such, ng: a refractive index relative to the g-line (wavelength $\lambda$=435.84 nm), nF: a refractive index relative to the F-line (wavelength $\lambda$=486.13 nm), and nC: a refractive index relative to a C-line (wavelength $\lambda$=656.27 nm).

11. The imaging optical system according to claim 1, wherein an object-side surface and an image-side surface of each of the lenses are each made of a curved surface or a planar surface.

12. The imaging optical system according to claim 1, wherein an object-side surface and an image-side surface of each of the lenses are each made of a spherical surface or a planar surface.

13. The imaging optical system according to claim 1, wherein the third lens group G3 has an image blur correction unit and has a rear unit on the image side of the image blur correction unit, respective powers of the image blur correction unit and the rear unit have different signs, the image blur correction unit has at least one positive lens and at least one negative lens, an aperture diaphragm is disposed between the second lens group G2 and the third lens group G3, and a conditional expression below is satisfied:

$$3.00 < |\Phi\_OS/\Phi| < 35.00 \tag{6}$$

where $\Phi\_OS$ denotes a focal length of the image blur correction unit.

* * * * *